United States Patent
Chung

(10) Patent No.: US 12,483,429 B2
(45) Date of Patent: Nov. 25, 2025

(54) PHYSICALLY UNCLONABLE FUNCTION PRODUCED USING OTP MEMORY

(71) Applicant: Attopsemi Technology Co., LTD, Hsinchu (TW)

(72) Inventor: Shine C. Chung, San Jose, CA (US)

(73) Assignee: ATTOPSEMI TECHNOLOGY CO., LTD, Hsinchu (TW)

( * ) Notice: Subject to any disclaimer, the term of this patent is extended or adjusted under 35 U.S.C. 154(b) by 484 days.

(21) Appl. No.: 17/828,018

(22) Filed: May 30, 2022

(65) Prior Publication Data

US 2022/0385486 A1    Dec. 1, 2022

Related U.S. Application Data

(60) Provisional application No. 63/195,709, filed on Jun. 1, 2021.

(51) Int. Cl.
| | | |
|---|---|---|
| H04L 9/32 | (2006.01) | |
| G11C 7/24 | (2006.01) | |
| G11C 17/16 | (2006.01) | |
| G11C 17/18 | (2006.01) | |
| H04L 9/06 | (2006.01) | |

(52) U.S. Cl.
CPC .............. *H04L 9/3278* (2013.01); *G11C 7/24* (2013.01); *G11C 17/16* (2013.01); *G11C 17/18* (2013.01); *H04L 9/0643* (2013.01); *H04L 2209/04* (2013.01); *H04L 2209/08* (2013.01)

(58) Field of Classification Search
CPC .......................... H04L 9/3278; H04L 9/0643
USPC .......................................................... 713/189
See application file for complete search history.

(56) References Cited

U.S. PATENT DOCUMENTS

| | | |
|---|---|---|
| 3,198,670 A | 8/1965 | Nissim |
| 3,715,242 A | 2/1973 | Daniel |
| 4,148,046 A | 4/1979 | Hendrickson et al. |
| 4,192,059 A | 3/1980 | Khan et al. |
| 4,642,674 A | 2/1987 | Schoofs |

(Continued)

FOREIGN PATENT DOCUMENTS

| | | |
|---|---|---|
| CN | 1469473 A | 1/2004 |
| CN | 1691204 A | 11/2005 |

(Continued)

OTHER PUBLICATIONS

U.S. Appl. No. 13/471,704, filed May 15, 2012.

(Continued)

*Primary Examiner* — Anthony D Brown

(57) ABSTRACT

An electronic device and method of generating a Physically Unclonable Function ("PUF") value is disclosed. An OTP memory with a plurality of OTP cells that can be reliably and deterministically programmed with a minimum and a maximum program voltage being selected for pre-conditioning. All OTP cells can be programmed at least once around the minimum program voltage to hide the program status. Data to be programmed into the OTP can be a fixed, time-varying voltage or data from an entropy source. The programmed OTP data can be masked for weak bits and further randomized to generate PUF output by compressing a bit stream into a single bit, e.g., single parity bit. The PUF output can be through a hash function and/or to generate keys.

23 Claims, 9 Drawing Sheets

(56) References Cited

U.S. PATENT DOCUMENTS

| | | |
|---|---|---|
| 4,879,689 A | 11/1989 | Atsumi |
| 5,192,989 A | 3/1993 | Matsushita et al. |
| 5,355,342 A | 10/1994 | Ueoka |
| 5,389,552 A | 2/1995 | Iranmanesh |
| 5,447,876 A | 9/1995 | Moyer et al. |
| 5,536,968 A | 7/1996 | Crafts |
| 5,548,225 A | 8/1996 | Rountree |
| 5,600,588 A | 2/1997 | Kawashima |
| 5,610,871 A | 3/1997 | Hidaka |
| 5,635,742 A | 6/1997 | Hoshi et al. |
| 5,637,901 A | 6/1997 | Beigel et al. |
| 5,723,890 A | 3/1998 | Fujihira et al. |
| 5,747,805 A | 5/1998 | Youngquist |
| 5,757,046 A | 5/1998 | Fujihira et al. |
| 5,761,148 A | 6/1998 | Allan et al. |
| 5,962,903 A | 10/1999 | Sung et al. |
| 5,973,900 A | 10/1999 | Sher |
| 6,002,156 A | 12/1999 | Lin |
| 6,008,092 A | 12/1999 | Gould |
| 6,034,882 A | 3/2000 | Johnson et al. |
| 6,054,344 A | 4/2000 | Liang et al. |
| 6,108,247 A | 8/2000 | Suzu |
| 6,128,239 A | 10/2000 | Perner |
| 6,140,687 A | 10/2000 | Shimormura et al. |
| 6,215,681 B1 | 4/2001 | Schuurman |
| 6,222,244 B1 | 4/2001 | Arndt et al. |
| 6,243,864 B1 | 6/2001 | Odani et al. |
| 6,249,472 B1 | 6/2001 | Tamura et al. |
| 6,346,727 B1 | 2/2002 | Ohtomo |
| 6,388,292 B1 | 5/2002 | Lin |
| 6,400,540 B1 | 6/2002 | Chang |
| 6,405,160 B1 | 6/2002 | Djaja et al. |
| 6,461,934 B2 | 10/2002 | Nishida et al. |
| 6,483,734 B1 | 11/2002 | Sharma et al. |
| 6,597,629 B1 | 7/2003 | Raszka et al. |
| 6,611,043 B2 | 8/2003 | Takiguchi |
| 6,728,137 B1 | 4/2004 | Lin |
| 6,731,535 B1 | 5/2004 | Ooishi et al. |
| 6,770,953 B2 | 8/2004 | Boeck et al. |
| 6,798,684 B2 | 9/2004 | Low et al. |
| 6,803,804 B2 | 10/2004 | Madurawe |
| 6,813,705 B2 | 11/2004 | Duesterwald et al. |
| 6,897,543 B1 | 5/2005 | Huang et al. |
| 6,934,176 B2 | 8/2005 | Low et al. |
| 6,944,083 B2 | 9/2005 | Pedlow |
| 6,967,879 B2 | 11/2005 | Mizukoshi |
| 7,009,182 B2 | 3/2006 | Kannan et al. |
| 7,102,951 B2 | 9/2006 | Paillet et al. |
| 7,167,397 B2 | 1/2007 | Paillet et al. |
| 7,211,843 B2 | 5/2007 | Low et al. |
| 7,212,432 B2 | 5/2007 | Ferrant et al. |
| 7,224,598 B2 | 5/2007 | Perner |
| 7,263,027 B2 | 8/2007 | Kim et al. |
| 7,294,542 B2 | 11/2007 | Okushima |
| 7,369,452 B2 | 5/2008 | Kenkare et al. |
| 7,391,064 B1 | 6/2008 | Tripsas et al. |
| 7,405,590 B1 | 7/2008 | Kaneko |
| 7,411,844 B2 | 8/2008 | Nitzan et al. |
| 7,439,608 B2 | 10/2008 | Arendt |
| 7,450,414 B2 | 11/2008 | Scheuerlein |
| 7,461,371 B2 | 12/2008 | Luo et al. |
| 7,573,762 B2 | 8/2009 | Kenkare et al. |
| 7,579,232 B1 | 8/2009 | Ping |
| 7,589,367 B2 | 9/2009 | Oh et al. |
| 7,609,578 B2 | 10/2009 | Buer et al. |
| 7,660,181 B2 | 2/2010 | Kumar et al. |
| 7,696,017 B1 | 4/2010 | Tripsas et al. |
| 7,701,038 B2 | 4/2010 | Chen et al. |
| 7,759,766 B2 | 7/2010 | Booth |
| 7,764,532 B2 | 7/2010 | Kurjanowicz et al. |
| 7,772,591 B1 | 8/2010 | Shih et al. |
| 7,802,057 B2 | 9/2010 | Iyer et al. |
| 7,808,815 B2 | 10/2010 | Ro et al. |
| 7,830,697 B2 | 11/2010 | Herner |
| 7,833,823 B2 | 11/2010 | Klersy |
| 7,834,659 B1 | 11/2010 | Im et al. |
| 7,852,656 B2 | 12/2010 | Shin et al. |
| 7,859,920 B2 | 12/2010 | Jung |
| 7,889,204 B2 | 2/2011 | Hansen et al. |
| 7,910,999 B2 | 3/2011 | Lee et al. |
| 8,008,723 B2 | 8/2011 | Nagai |
| 8,050,129 B2 | 11/2011 | Liu et al. |
| 8,089,137 B2 | 1/2012 | Lung et al. |
| 8,115,280 B2 | 2/2012 | Chen et al. |
| 8,119,048 B2 | 2/2012 | Nishimura |
| 8,154,005 B2 | 4/2012 | Hsia |
| 8,168,538 B2 | 5/2012 | Chen et al. |
| 8,174,063 B2 | 5/2012 | Liu et al. |
| 8,174,922 B2 | 5/2012 | Naritake |
| 8,179,711 B2 | 5/2012 | Kim et al. |
| 8,183,665 B2 | 5/2012 | Bertin et al. |
| 8,203,899 B2 | 6/2012 | Chen |
| 8,217,490 B2 | 7/2012 | Bertin et al. |
| 8,233,316 B2 | 7/2012 | Liu et al. |
| 8,339,079 B2 | 12/2012 | Yamada |
| 8,369,166 B2 | 2/2013 | Kurjanowicz et al. |
| 8,373,254 B2 | 2/2013 | Chen et al. |
| 8,380,768 B2 | 2/2013 | Hoefler |
| 8,415,764 B2 | 4/2013 | Chung |
| 8,482,972 B2 | 7/2013 | Chung |
| 8,488,359 B2 | 7/2013 | Chung |
| 8,488,364 B2 | 7/2013 | Chung |
| 8,503,141 B2 | 8/2013 | Mallikarjunaswamy |
| 8,514,606 B2 | 8/2013 | Chung |
| 8,526,254 B2 | 9/2013 | Kurjanowicz et al. |
| 8,559,208 B2 | 10/2013 | Chung |
| 8,570,800 B2 | 10/2013 | Chung |
| 8,576,602 B2 | 11/2013 | Chung |
| 8,598,639 B2 | 12/2013 | Hsin |
| 8,607,019 B2 | 12/2013 | Chung |
| 8,643,085 B2 | 2/2014 | Pfirsch |
| 8,644,049 B2 | 2/2014 | Chung |
| 8,648,349 B2 | 2/2014 | Masuda et al. |
| 8,649,203 B2 | 2/2014 | Chung |
| 8,680,620 B2 | 3/2014 | Salcedo |
| 8,699,259 B2 | 4/2014 | Zhang et al. |
| 8,760,904 B2 | 6/2014 | Chung |
| 8,804,398 B2 | 8/2014 | Chung |
| 8,817,563 B2 | 8/2014 | Chung |
| 8,830,720 B2 | 9/2014 | Chung |
| 8,848,423 B2 | 9/2014 | Chung |
| 8,854,859 B2 | 10/2014 | Chung |
| 8,861,249 B2 | 10/2014 | Chung |
| 8,913,415 B2 | 12/2014 | Chung |
| 8,913,449 B2 | 12/2014 | Chung |
| 8,923,070 B2 | 12/2014 | Xia |
| 8,923,085 B2 | 12/2014 | Chung |
| 8,929,122 B2 | 1/2015 | Chung |
| 8,988,965 B2 | 3/2015 | Chung |
| 9,019,742 B2 | 4/2015 | Chung |
| 9,019,791 B2 | 4/2015 | Chung |
| 9,025,357 B2 | 5/2015 | Chung |
| 9,070,437 B2 | 6/2015 | Chung |
| 9,178,100 B2 | 11/2015 | Webster |
| 9,236,141 B2 | 1/2016 | Chung |
| 9,281,038 B2 | 3/2016 | Chung |
| 9,305,973 B2 | 4/2016 | Chung |
| 9,324,447 B2 | 4/2016 | Chung |
| 9,324,849 B2 | 4/2016 | Chung |
| 9,343,176 B2 | 5/2016 | Chung |
| 9,449,687 B1 | 9/2016 | Piccardi |
| 9,460,807 B2 | 10/2016 | Chung |
| 9,478,306 B2 | 10/2016 | Chung |
| 9,548,109 B2 | 1/2017 | Chung |
| 9,548,131 B1 | 1/2017 | Bill |
| 9,767,915 B2 | 9/2017 | Chung |
| 9,774,317 B1 * | 9/2017 | Diamant ............... H03K 3/84 |
| 9,818,478 B2 | 11/2017 | Chung |
| 9,838,025 B1 | 12/2017 | Deng |
| 9,852,783 B1 | 12/2017 | Na |
| 9,981,970 B2 | 5/2018 | Liu et al. |
| 10,192,615 B2 | 1/2019 | Chung |
| 10,541,025 B2 | 1/2020 | Nazarian |
| 10,586,832 B2 | 3/2020 | Chung |

(56) References Cited

U.S. PATENT DOCUMENTS

| | | |
|---|---|---|
| 10,726,896 B1 | 7/2020 | Jacob |
| 10,916,317 B2 | 2/2021 | Chung |
| 2001/0007541 A1 | 7/2001 | Hirakawa |
| 2002/0018355 A1 | 2/2002 | Johnson et al. |
| 2002/0042636 A1 | 4/2002 | Koshiol |
| 2002/0075744 A1 | 6/2002 | McCollum |
| 2002/0168821 A1 | 11/2002 | Williams et al. |
| 2002/0196659 A1 | 12/2002 | Hurst et al. |
| 2003/0043616 A1 | 3/2003 | Baker |
| 2003/0104860 A1 | 6/2003 | Cannon et al. |
| 2003/0135709 A1 | 7/2003 | Niles et al. |
| 2003/0169625 A1 | 9/2003 | Hush et al. |
| 2004/0057271 A1 | 3/2004 | Parkinson |
| 2004/0100845 A1 | 5/2004 | Subramanian |
| 2004/0113183 A1 | 6/2004 | Karpov et al. |
| 2004/0130924 A1 | 7/2004 | Ma et al. |
| 2005/0013162 A1 | 1/2005 | Jeon |
| 2005/0052915 A1 | 3/2005 | Herner |
| 2005/0056825 A1 | 3/2005 | Berlin |
| 2005/0060500 A1 | 3/2005 | Luo et al. |
| 2005/0062110 A1 | 3/2005 | Dietz et al. |
| 2005/0093092 A1 | 5/2005 | Tran |
| 2005/0110081 A1 | 5/2005 | Pendharkar |
| 2005/0124116 A1 | 6/2005 | Hsu et al. |
| 2005/0146962 A1 | 7/2005 | Schreck |
| 2005/0242386 A1 | 11/2005 | Ang |
| 2006/0067099 A1 | 3/2006 | Kim |
| 2006/0072357 A1 | 4/2006 | Wicker |
| 2006/0092689 A1 | 5/2006 | Braun et al. |
| 2006/0104111 A1 | 5/2006 | Tripsas et al. |
| 2006/0108575 A1 | 5/2006 | Lee et al. |
| 2006/0120148 A1 | 6/2006 | Kim et al. |
| 2006/0129782 A1 | 6/2006 | Bansal et al. |
| 2006/0215440 A1 | 9/2006 | Cho et al. |
| 2006/0244099 A1 | 11/2006 | Kurjanowicz |
| 2006/0285385 A1 | 12/2006 | Kuo |
| 2007/0004160 A1 | 1/2007 | Voldman |
| 2007/0008776 A1 | 1/2007 | Scheuerlein et al. |
| 2007/0030026 A1 | 2/2007 | Hsu et al. |
| 2007/0057323 A1 | 3/2007 | Furukawa et al. |
| 2007/0058422 A1 | 3/2007 | Phillips |
| 2007/0058473 A1 | 3/2007 | Kouchi |
| 2007/0081377 A1 | 4/2007 | Zheng et al. |
| 2007/0133341 A1 | 6/2007 | Lee et al. |
| 2007/0138549 A1 | 6/2007 | Wu et al. |
| 2007/0164347 A1 | 7/2007 | Kim |
| 2007/0166937 A1 | 7/2007 | Adetutu |
| 2007/0183213 A1 | 8/2007 | Kusakabe |
| 2007/0218665 A1 | 9/2007 | Sutardja |
| 2007/0223266 A1 | 9/2007 | Chen |
| 2007/0279978 A1 | 12/2007 | Ho et al. |
| 2007/0284656 A1 | 12/2007 | Radigan |
| 2008/0025067 A1 | 1/2008 | Scheuerlein et al. |
| 2008/0025068 A1 | 1/2008 | Scheuerlein et al. |
| 2008/0028134 A1 | 1/2008 | Matsubara et al. |
| 2008/0044959 A1 | 2/2008 | Cheng et al. |
| 2008/0067601 A1 | 3/2008 | Chen |
| 2008/0105878 A1 | 5/2008 | Ohara |
| 2008/0137401 A1 | 6/2008 | Philipp |
| 2008/0144354 A1 | 6/2008 | Choi |
| 2008/0151612 A1 | 6/2008 | Pellizzer et al. |
| 2008/0170429 A1 | 7/2008 | Bertin et al. |
| 2008/0175060 A1 | 7/2008 | Liu et al. |
| 2008/0185568 A1 | 8/2008 | Kwon |
| 2008/0205115 A1 | 8/2008 | Ho |
| 2008/0220560 A1 | 9/2008 | Klersy |
| 2008/0225567 A1 | 9/2008 | Burr et al. |
| 2008/0280401 A1 | 11/2008 | Burr et al. |
| 2008/0310236 A1 | 12/2008 | Baker |
| 2008/0316852 A1 | 12/2008 | Matsufuji et al. |
| 2009/0039420 A1 | 2/2009 | Trivedi |
| 2009/0055617 A1 | 2/2009 | Bansal et al. |
| 2009/0092245 A1* | 4/2009 | Fumaroli ............... H04L 9/003 380/28 |
| 2009/0115021 A1 | 5/2009 | Moriwaki |
| 2009/0141573 A1 | 6/2009 | Hsueh |
| 2009/0168493 A1 | 7/2009 | Kim et al. |
| 2009/0172315 A1 | 7/2009 | Iyer et al. |
| 2009/0180310 A1 | 7/2009 | Shimomura et al. |
| 2009/0194839 A1 | 8/2009 | Bertin et al. |
| 2009/0213660 A1 | 8/2009 | Pikhay et al. |
| 2009/0219756 A1 | 9/2009 | Schroegmeier et al. |
| 2009/0251943 A1 | 10/2009 | Kurjanowicz |
| 2009/0269932 A1 | 10/2009 | Chen |
| 2009/0273964 A1 | 11/2009 | Yamazaki |
| 2009/0296933 A1 | 12/2009 | Akselrod |
| 2009/0309089 A1 | 12/2009 | Hsia et al. |
| 2010/0002501 A1 | 1/2010 | Leuschner |
| 2010/0027326 A1 | 2/2010 | Kim et al. |
| 2010/0034016 A1 | 2/2010 | Liu et al. |
| 2010/0061136 A1 | 3/2010 | Koyama et al. |
| 2010/0080035 A1 | 4/2010 | Venkatraman |
| 2010/0085798 A1 | 4/2010 | Lu et al. |
| 2010/0091546 A1 | 4/2010 | Liu et al. |
| 2010/0103721 A1 | 4/2010 | Guha |
| 2010/0110814 A1 | 5/2010 | Shimogawa |
| 2010/0142254 A1 | 6/2010 | Choi et al. |
| 2010/0157651 A1 | 6/2010 | Kumar et al. |
| 2010/0171086 A1 | 7/2010 | Lung et al. |
| 2010/0177547 A1 | 7/2010 | Shen |
| 2010/0201410 A1 | 8/2010 | Illegems |
| 2010/0219392 A1 | 9/2010 | Awaya |
| 2010/0232203 A1 | 9/2010 | Chung et al. |
| 2010/0238701 A1 | 9/2010 | Tsukamoto et al. |
| 2010/0246237 A1 | 9/2010 | Borot et al. |
| 2010/0250974 A1 | 9/2010 | Ristic |
| 2010/0271064 A1 | 10/2010 | Kohler |
| 2010/0277967 A1 | 11/2010 | Lee et al. |
| 2010/0301304 A1 | 12/2010 | Chen et al. |
| 2010/0301926 A1 | 12/2010 | Dell |
| 2010/0321976 A1 | 12/2010 | Jung |
| 2011/0022648 A1 | 1/2011 | Harris et al. |
| 2011/0051491 A1 | 3/2011 | Takizawa |
| 2011/0062557 A1 | 3/2011 | Bandyopadhyay et al. |
| 2011/0108926 A1 | 5/2011 | Bahl |
| 2011/0127627 A1 | 6/2011 | Hoofman |
| 2011/0128772 A1 | 6/2011 | Kim et al. |
| 2011/0145777 A1 | 6/2011 | Iyer et al. |
| 2011/0175199 A1 | 7/2011 | Lin et al. |
| 2011/0186990 A1 | 8/2011 | Mawatari |
| 2011/0222330 A1 | 9/2011 | Lee et al. |
| 2011/0235388 A1 | 9/2011 | Nakano |
| 2011/0260289 A1 | 10/2011 | Oyamada |
| 2011/0267869 A1 | 11/2011 | Hoefler |
| 2011/0286261 A1 | 11/2011 | Sakuguchi |
| 2011/0297912 A1 | 12/2011 | Samachisa et al. |
| 2011/0310655 A1 | 12/2011 | Kreupl et al. |
| 2011/0312166 A1 | 12/2011 | Yedinak et al. |
| 2012/0032303 A1 | 2/2012 | Elkareh et al. |
| 2012/0039107 A1 | 2/2012 | Chung |
| 2012/0044736 A1 | 2/2012 | Chung |
| 2012/0044737 A1 | 2/2012 | Chung |
| 2012/0044738 A1 | 2/2012 | Chung |
| 2012/0044739 A1 | 2/2012 | Chung |
| 2012/0044740 A1 | 2/2012 | Chung |
| 2012/0044743 A1 | 2/2012 | Chung |
| 2012/0044744 A1 | 2/2012 | Chung |
| 2012/0044745 A1 | 2/2012 | Chung |
| 2012/0044746 A1 | 2/2012 | Chung |
| 2012/0044747 A1 | 2/2012 | Chung |
| 2012/0044748 A1 | 2/2012 | Chung |
| 2012/0044753 A1 | 2/2012 | Chung |
| 2012/0044756 A1 | 2/2012 | Chung |
| 2012/0044757 A1 | 2/2012 | Chung |
| 2012/0044758 A1 | 2/2012 | Chung |
| 2012/0047322 A1 | 2/2012 | Chung |
| 2012/0074372 A1 | 3/2012 | Yang |
| 2012/0074460 A1 | 3/2012 | Kitagawa |
| 2012/0074507 A1 | 3/2012 | Jo |
| 2012/0083090 A1 | 4/2012 | Tsai |
| 2012/0106231 A1 | 5/2012 | Chung |
| 2012/0120707 A1 | 5/2012 | Kim |
| 2012/0147653 A1 | 6/2012 | Chung |
| 2012/0147657 A1 | 6/2012 | Sekar et al. |

(56) References Cited

U.S. PATENT DOCUMENTS

| | | |
|---|---|---|
| 2012/0182783 A1 | 7/2012 | Bedeschi |
| 2012/0195099 A1 | 8/2012 | Miao |
| 2012/0209888 A1 | 8/2012 | Chung |
| 2012/0224406 A1 | 9/2012 | Chung |
| 2012/0224413 A1 | 9/2012 | Zhang et al. |
| 2012/0256292 A1 | 10/2012 | Yu et al. |
| 2012/0257435 A1 | 10/2012 | Lin |
| 2012/0268980 A1 | 10/2012 | Awaya |
| 2012/0287730 A1 | 11/2012 | Kim |
| 2012/0314472 A1 | 12/2012 | Chung |
| 2012/0314473 A1 | 12/2012 | Chung |
| 2012/0320656 A1 | 12/2012 | Chung |
| 2012/0320657 A1 | 12/2012 | Chung |
| 2013/0003436 A1 | 1/2013 | Kumar |
| 2013/0006559 A1 | 1/2013 | Grosjean |
| 2013/0135503 A1 | 5/2013 | Park |
| 2013/0148409 A1 | 6/2013 | Chung |
| 2013/0161780 A1 | 6/2013 | Kizilyalli et al. |
| 2013/0189829 A1 | 7/2013 | Mieczkowski et al. |
| 2013/0200488 A1 | 8/2013 | Chung |
| 2013/0201745 A1 | 8/2013 | Chung |
| 2013/0201746 A1 | 8/2013 | Chung |
| 2013/0201748 A1 | 8/2013 | Chung |
| 2013/0201749 A1 | 8/2013 | Chung |
| 2013/0208526 A1 | 8/2013 | Chung |
| 2013/0215663 A1 | 8/2013 | Chung |
| 2013/0235644 A1 | 9/2013 | Chung |
| 2013/0268526 A1 | 10/2013 | John et al. |
| 2013/0268727 A1 | 10/2013 | Sohn |
| 2013/0286710 A1 | 10/2013 | Hall |
| 2013/0294136 A1 | 11/2013 | Siau |
| 2013/0307821 A1 | 11/2013 | Kogo |
| 2013/0308366 A1 | 11/2013 | Chung |
| 2014/0010032 A1 | 1/2014 | Seshadri et al. |
| 2014/0016394 A1 | 1/2014 | Chung et al. |
| 2014/0022004 A1 | 1/2014 | Luo |
| 2014/0071726 A1 | 3/2014 | Chung |
| 2014/0071751 A1 | 3/2014 | Kim |
| 2014/0092674 A1 | 4/2014 | Chung |
| 2014/0124871 A1 | 5/2014 | Ko et al. |
| 2014/0124895 A1 | 5/2014 | Salzman et al. |
| 2014/0126266 A1 | 5/2014 | Chung |
| 2014/0131710 A1 | 5/2014 | Chung |
| 2014/0131711 A1 | 5/2014 | Chung |
| 2014/0131764 A1 | 5/2014 | Chung |
| 2014/0133056 A1 | 5/2014 | Chung |
| 2014/0160830 A1 | 6/2014 | Chung |
| 2014/0169063 A1 | 6/2014 | August |
| 2014/0211567 A1 | 7/2014 | Chung |
| 2014/0211577 A1 | 7/2014 | Ryu |
| 2014/0269135 A1 | 9/2014 | Chung |
| 2014/0340954 A1 | 11/2014 | Chung |
| 2014/0369133 A1 | 12/2014 | Lee et al. |
| 2015/0003142 A1 | 1/2015 | Chung |
| 2015/0003143 A1 | 1/2015 | Chung |
| 2015/0009743 A1 | 1/2015 | Chung |
| 2015/0014785 A1 | 1/2015 | Chung |
| 2015/0021543 A1 | 1/2015 | Chung |
| 2015/0029777 A1 | 1/2015 | Chung |
| 2015/0078060 A1 | 3/2015 | Chung |
| 2015/0130509 A1 | 5/2015 | He |
| 2015/0137258 A1 | 5/2015 | Mittal |
| 2015/0187414 A1 | 7/2015 | Perner |
| 2015/0194433 A1 | 7/2015 | Ponoth |
| 2015/0200270 A1 | 7/2015 | Flachowsky |
| 2015/0206586 A1 | 7/2015 | Chang |
| 2015/0249428 A1 | 9/2015 | Huynh |
| 2015/0276500 A1 | 10/2015 | Walker |
| 2015/0325626 A1 | 11/2015 | Lin |
| 2015/0326129 A1 | 11/2015 | Lin |
| 2015/0380103 A1 | 12/2015 | Braun et al. |
| 2016/0003880 A1 | 1/2016 | Deschildre |
| 2016/0005492 A1 | 1/2016 | Barsilai |
| 2016/0034351 A1 | 2/2016 | Michael |
| 2016/0035423 A1 | 2/2016 | Nam |
| 2016/0071582 A1 | 3/2016 | Chung |
| 2016/0078919 A1 | 3/2016 | Han |
| 2016/0149586 A1 | 5/2016 | Roh |
| 2016/0247580 A1 | 8/2016 | Chen |
| 2016/0268002 A1 | 9/2016 | Chen |
| 2016/0276042 A1 | 9/2016 | Pesavento |
| 2016/0276043 A1 | 9/2016 | Chung |
| 2016/0329810 A1 | 11/2016 | Lee et al. |
| 2016/0336062 A1 | 11/2016 | Buchanan |
| 2016/0358648 A1 | 12/2016 | Park |
| 2017/0053708 A1 | 2/2017 | Wong |
| 2017/0053716 A1 | 2/2017 | Kim |
| 2017/0076733 A1 | 3/2017 | Noguchi |
| 2017/0103699 A1 | 4/2017 | Lin |
| 2017/0110170 A1 | 4/2017 | Kong |
| 2017/0110512 A1 | 4/2017 | Chung |
| 2017/0149395 A1 | 5/2017 | Patel |
| 2017/0178745 A1 | 6/2017 | Chen |
| 2017/0199537 A1 | 7/2017 | Duong |
| 2017/0221544 A1 | 8/2017 | Baeck |
| 2017/0250187 A1 | 8/2017 | Taniguchi |
| 2017/0263313 A1 | 9/2017 | Chou |
| 2017/0271005 A1 | 9/2017 | Renane |
| 2017/0316834 A1 | 11/2017 | Huynh |
| 2017/0364276 A1 | 12/2017 | Bhuiyan |
| 2017/0365360 A1 | 12/2017 | Fackenthal |
| 2018/0005703 A1 | 1/2018 | Nguyen |
| 2018/0059958 A1 | 3/2018 | Ryan |
| 2018/0075906 A1 | 3/2018 | Chung |
| 2018/0095489 A1 | 4/2018 | Fang |
| 2018/0096730 A1 | 4/2018 | Vo |
| 2018/0097447 A1 | 4/2018 | Iorio |
| 2018/0122817 A1 | 5/2018 | Ramaswamy |
| 2018/0204512 A1 | 7/2018 | Han |
| 2019/0279712 A1 | 9/2019 | Siau |
| 2019/0303236 A1 | 10/2019 | Ellis |
| 2019/0325949 A1 | 10/2019 | Gupta |
| 2019/0341107 A1 | 11/2019 | Bertin |
| 2019/0341393 A1 | 11/2019 | Peng |
| 2019/0371394 A1 | 12/2019 | Yang |
| 2019/0371402 A1 | 12/2019 | Lin |
| 2019/0378551 A1 | 12/2019 | Kim |
| 2019/0378579 A1 | 12/2019 | Zhao |
| 2019/0378581 A1 | 12/2019 | Zhao |
| 2019/0392889 A1 | 12/2019 | Trivedi |
| 2019/0392893 A1 | 12/2019 | Yang |
| 2020/0105341 A1 | 4/2020 | Wu |
| 2020/0194499 A1 | 6/2020 | Chung |
| 2021/0020226 A1 | 1/2021 | Lim |
| 2021/0066318 A1 | 3/2021 | Chang |
| 2021/0110067 A1* | 4/2021 | Suresh ............... G06F 21/31 |
| 2022/0191033 A1* | 6/2022 | Chen ............... G06F 21/575 |
| 2022/0231026 A1 | 7/2022 | Wu |
| 2022/0399491 A1 | 12/2022 | Cheng |
| 2023/0098708 A1 | 3/2023 | Chang |

FOREIGN PATENT DOCUMENTS

| | | |
|---|---|---|
| CN | 101057330 A | 10/2007 |
| CN | 101083227 A | 12/2007 |
| CN | 101188140 A | 5/2008 |
| CN | 101271881 A | 9/2008 |
| CN | 101483062 A | 7/2009 |
| CN | 101728412 A | 6/2010 |
| CN | 102385932 A | 3/2012 |
| CN | 102610272 A | 7/2012 |
| EP | 1367596 A1 | 12/2003 |
| JP | 03-264814 | 11/1991 |
| TW | I309081 | 10/2007 |
| WO | 2010131310 A1 | 11/2010 |

OTHER PUBLICATIONS

U.S. Appl. No. 13/026,650, filed Feb. 14, 2011.
U.S. Appl. No. 13/026,656, filed Feb. 14, 2011.
U.S. Appl. No. 13/026,664, filed Feb. 14, 2011.
U.S. Appl. No. 13/026,678, filed Feb. 14, 2011.
U.S. Appl. No. 13/026,692, filed Feb. 14, 2011.

(56) References Cited

OTHER PUBLICATIONS

U.S. Appl. No. 13/026,704, filed Feb. 14, 2011.
U.S. Appl. No. 13/026,717, filed Feb. 14, 2011.
U.S. Appl. No. 13/026,725, filed Feb. 14, 2011.
U.S. Appl. No. 13/026,752, filed Feb. 14, 2011.
U.S. Appl. No. 13/026,771, filed Feb. 14, 2011.
U.S. Appl. No. 13/026,783, filed Feb. 14, 2011.
U.S. Appl. No. 13/026,835, filed Feb. 14, 2011.
U.S. Appl. No. 13/026,840, filed Feb. 14, 2011.
U.S. Appl. No. 13/026,852, filed Feb. 14, 2011.
U.S. Appl. No. 13/214,198, filed Aug. 21, 2011.
U.S. Appl. No. 13/590,044, filed Aug. 20, 2012.
U.S. Appl. No. 13/590,047, filed Aug. 20, 2012.
U.S. Appl. No. 13/590,049, filed Aug. 20, 2012.
U.S. Appl. No. 13/590,050, filed Aug. 20, 2012.
U.S. Appl. No. 13/214,183, filed Aug. 20, 2011.
U.S. Appl. No. 13/288,843, filed Nov. 3, 2011.
U.S. Appl. No. 13/314,444, filed Dec. 8, 2011.
U.S. Appl. No. 13/397,673, filed Feb. 15, 2012.
U.S. Appl. No. 13/571,797, filed Aug. 10, 2012.
U.S. Appl. No. 13/678,539, filed Nov. 15, 2012.
U.S. Appl. No. 13/678,544, filed Nov. 15, 2012.
U.S. Appl. No. 13/678,541, filed Nov. 15, 2012.
U.S. Appl. No. 13/678,543, filed Nov. 15, 2012.
Ahn, S.J. et al., "Highly Reliable 50nm Contact Cell Technology for 256Mb PRAM," IEEE VLSI Tech Symp., Jun. 2005, pp. 98-99.
Alavi, Mohsen, et al., "A PROM Element Based on Salicide Allgomeration of Poly Fuses in a CMOS Logic Process," IEEE IEDM, 97, pp. 855-858.
Andre, T. W. et al., "A 4-Mb 0.18um 1T1MTJ Toggle MRAM With Balanced Three Input Sensing Scheme and Locally Mirrored Unidirectional Write Drivers," IEEE J. of Solid-State Circuits, vol. 40, No. 1, Jan. 2005, pp. 301-309.
Ang, Boon et al., "NiSi Polysilicon Fuse Reliability in 65nm Logic CMOS Technology," IEEE Trans. on Dev. Mat. Rel. Vol. 7, No. 2, Jun. 2007, pp. 298-303.
Aziz, A. et al., "Lateral Polysilicon n+p Diodes: Effect of the Grain boundaries and of the p-Implemented Doping Level on the I-V and C-V Characteristics, Springer Proceedings in Physics", vol. 54, 1991, pp. 318-322.
Aziz, A. et al., "Lateral Polysilicon PN Diodes: Current-Voltage Characteristics Simulation Between 200K and 400K a Numerical Approach," IEEE Trans. On Elec. Dev., vol. 41, No. 2, Feb. 1994, pp. 204-211.
Banerjee, Kaustav et al., "High Current Effects in Silicide Films for Sub-0.25um VLSI Technologies," IEEE 36th IRPS, 1998, pp. 284-292.
Bedeschi, F. et al., "4-Mb MOSFET-Selected uTrench Phase-Change Memory Experimental Chip," IEEE J. of Solid-State Circuits, vol. 40, No. 7, Jul. 2005, pp. 1557-1565.
Bedeschi, F. et al., "A Bipolar-Selected Phase Change Memory Featuring Multi- Level Cell Storage," IEEE J. Sol. Stat. Cir., vol. 44, No. 1, Jan. 2009, pp. 217-227.
Bedeschi, F. et al., "A Fully Symmetrical Sense Amplifier for Non-volatile Memories," IEEE. Int. Symp. On Circuits and Systems, (ISCAS), vol. 2, 2004, pp. 625-628.
Bedeschi, F. et al., "An 8Mb Demonstrator for High-Density 1.8V Phase-Change Memories," VLIS Cir. Symp, Jun. 2004, pp. 442-445.
Bedeschi, F. et al., "SET and RESET Pulse Characterization in BJT-Selected Phase-Change Memory," IEEE Int. Symp. On Circuits and Systems (ISCAS), 2005, pp. 1270-1273.
Braganca, P. M. et al., "A Three-Terminal Approach to Developing Spin-Torque Written Magnetic Random Access Memory Cells," IEEE Trans. on Nano. vol. 8, No. 2, Mar. 2009, pp. 190-195.
Cagli, C. et al., "Evidence for threshold switching in the set process of NiO-based RRAM and physical modeling for set, reset, retention and disturb prediction," IEEE IEDM, 2008, pp. 1-4.

Chan, W. T. et al., "CMOS Compatible Zero-Mask One-Time Programmable (OTP) Memory Design," Proc. Int. Conf. Solid State Integr. Cir. Tech., Beijing, China, Oct. 20-23, 2008. pp. 861-864.
Chan, Wan Tim, et al., "CMOS Compatible Zero-Mask One Time Programmable Memory Design", Master Thesis, Hong-Kong University of Science and Technologies, 2008.
Chang, Meng-Fan et al., "Circuit Design Challenges in Embedded Memory and Resistive RAM (RRAM) for Mobile SoC and 3D-IC", Design Automation Conference (ASP-DAC), 16th Asia and South Pacific, 2011, pp. 197-203.
Cheng, Yu-Hsing et al., "Failure Analysis and Optimization of Metal Fuses for Post Package Trimming," IEEE 45th IRPS, 2007, pp. 616-617.
Chiu, Pi-Feng et al., "A Low Store Energy, Low VDDmin, Nonvolatile 8T2R SRAM with 3D Stacked RRAM Devices for Low Power Mobile Applications," IEEE VLSI Cir./Tech Symp., Jun. 2010, pp. 229-230.
Cho, Woo Yeong et al., "A 0.18um 3.0V 64Mb Non-Volatile Phase-Transition Random-Access Memory (PRAM)," ISSCC, Feb. 2004, Sec. 2-1.
Choi, Sang-Jun et al., "Improvement of CBRAM Resistance Window by Scaling Down Electrode Size in Pure-GeTe Film," IEEE Elec. Dev., vol. 30, No. 2, Feb. 2009, pp. 120-122.
Choi, Youngdon et al., "A 20nm 1.8V 8Gb PRAM with 40MB/s Program Bandwidth," IEEE ISSCC, 2012, pp. 46-47.
Chung, S. et al., "A 1.25um2 Cell 32Kb Electrical Fuse Memory in 32nm CMOS with 700mV Vddmin and Parallel/Serial Interface," VLSI Cir. Symp., Jun. 2009, pp. 30-31.
Chung, S. et al., "A 512x8 Electrical Fuse Memory with 15um2 Cells Using 8-sq Asymmetrical Fuse and Core Devices in 90nm CMOS," VLSI Cir. Symp., Jun. 2007, pp. 74-75.
Crowley, Matthew et al., "512Mb PROM with 8 Layers of Antifuse/Diode Cells," IEEE ISSCC 2003, Sec. 16.4.
De Sandre, Guido et al., "A 4Mb LV MOS-Selected Embedded Phase Change Memory in 90nm Standard CMOS Technology," IEEE J. Sol. Stat. Cir, vol. 46. No. 1, Jan. 2011, pp. 52-63.
De Sandre, Guido et al., "A 90nm 4Mb Embedded Phase-Change Memory with 1.2V 12ns Read Access Time and 1MB/s Write Throughput," ISSCC 2010, Sec. 14.7.
Desikan, Rajagopalan et al., "On-Chip MRAM as a High-Bandwidth Low-Latency Replacement for DRAM Physical Memories," Tech Report TR-02-47, Dept. of Computer Science, University of Texas, Austin, Sep. 27, 2002, 18 pages.
Dietrich, Stefan et al., "A Nonvolatile 2-Mbit CBRAM Memory Core Featuring Advanced Read and Program Control," IEEE J. of Solid-Stat Cir., vol. 42, No. 4, Apr. 2007, pp. 839-845.
Dion, Michael J., "Reservoir Modeling for Electromigration Improvement of Metal Systems with Refractory Barriers," IEEE 39th IRPS, 2001, pp. 327-333.
Doorn, T. S. et al., "Ultra-fast Programming of Silicided Polysilicon Fuses Based On New Insights in the Programming Physics," IEEE IEDM, 2005, pp. 667-670.
Doorn, T. S., "Detailed Qualitative Model for the Programming Physics of Silicided Polysilicon Fuses," IEEE Trans. on Elec. Dev. vol. 54, No. 12, Dec. 2007, pp. 3285-3291.
Durlam, M. et al., "A 1-Mbit MRAM Based on 1T1MTJ Bit Cell Integrated With Copper Interconnects," IEEE J. of Solid-State Circuits, vol. 38, No. 5, May 2003, pp. 769-773.
Engel, B. et al., "The Science and Technology of Magnetoresistive Tunnel Memory," IEEE Tran. on Nanotechnology, vol. 1, No. 1, Mar. 2002, pp. 32-38.
Engel, B.N. et al., "A 4Mb Toggle MRAM Based on a Novel bit and Switching Method," IEEE Trans. on Mag. vol. 41, No. 1, Jan. 2005, pp. 132-136.
Fellner, Johannes, et al., "Lifetime Study for a Poly Fuse in a 0.35um Polycide CMOS Process," IEEE 43rd IRPS, 2005, pp. 446-449.
Gao, B. et al., "Oxide-Based RRAM: Uniformity Improvement Using A New Material-Oriented Methodology," IEEE VLSI Tech. Symp., Jun. 2009, pp. 30-31.
Gao, B. et al., "Oxide-Based RRAM Switching Mechanism: A New Ion-Transport-Recombination Model," IEDM, Dec. 2008, pp. 563-566.

(56) References Cited

OTHER PUBLICATIONS

Gill, M. et al., "Ovonic Unified Memory—A High Performance Nonvolatile Memory Technology for Stand-Alone Memory and Embedded Applications," IEEE, ISSCC Dig. of Tech. Paper, Feb. 2002, pp. 202-203.
Gogl, D. et al., "A 16-Mb MRAM Featuring Bootstrapped Write Drivers," IEEE J. of Solid-State Circuits, vol. 40, No. 4, Apr. 2005, pp. 902-908.
Gopalan, C. et al., Demonstration of Conductive Bridging Random Access Memory (CBRAM) in Logic CMOS Process, IEEE Int. Memory Workshop, 2010, pp. 1-4.
Ha, Daewon and Kim, Kinam, "Recent Advances in High Density Phase Change Memory (PRAM)," IEEE VLSI Tech. Symp. Jun. 2007.
Hosoi, Y. et al., "High Speed Unipolar Switching Resistance RAM (RRAM) Technology," IEEE IEDM, Dec. 2006, pp. 1-4.
Hosomi, M. et al., "A Novel Nonvolatile Memory with Spin Torque Transfer Magnetization Switching: Spin-RAM," IEEE IEDM Dig. of Tech. Paper, Dec. 2005, pp. 459-463.
Huang, Chia-En et al., "A New CMOS Logic Anti-Fuse Cell with Programmable Contact," IEEE IEDM Tech. Dig. 2007, pp. 48-51.
Im, Jay et al., "Characterization of Silicided Polysilicon Fuse Implemented in 65nm CMOS Technology," 7th Annual Non-Volatile Memory Technology Symp, (NVMTS) 2006, pp. 55-57.
Jin, Li-Yan et al., "Low-Area 1-Kb Multi-Bit OTP IP Design," IEEE 8th Int. Conf. on ASIC (ASICON), 2009. pp. 629-632.
Johnson, Mark et al., "512Mb PROM with a Three-Dimensional Array of Diode/Antifuse Memory Cells," IEEE J. of Sol. Stat. Cir., vol. 38, No. 11, Nov. 2003, pp. 1920-1928.
Kalnitsy, Alexander et al., "CoSi2 Integrated Fuses on Poly Silicon for Low Voltage 0.18um CMOS Applications," IEEE IEDM 1999, pp. 765-768.
Kang, Han-Byul et al., "Electromigration of NiSi Poly Gated Electrical Fuse and Its Resistance Behaviors Induced by High Temperature," IEEE IRPS, 2010, pp. 265-270.
Kang, Sangbeom et al., "A 0.1um 1.8V 256Mb Phase-Change Random Access Memory (PRAM) with 66Mhz Synchronous Burst-Read," IEEE J. of Sol. Stat. Cir. vol. 42. No. 1, Jan. 2007, pp. 210-218.
Kawahara, T. et al., "2Mb Spin-Transfer Torque RAM (SPRAM) with Bit-by-Bit Bidirectional Current Write and Parallelizing-Direction Current Read," IEEE ISSCC Dig. of Tech. Paper, Feb. 2007, pp. 480-481.
Ker, Ming-Dou et al., "High-Current Characterization of Polysilicon Diode for Electrostatic Discharge Protection in Sub-Quarter-Micron Complementary Metal Oxide Semiconductor Technology," Jpn. J. Appl. Phys. vol. 42 (2003) pp. 3377-3378.
Ker, Ming-Dou et al., "Ultra-High-Voltage Charge Pump Circuit in Low-Voltage Bulk CMOS Processes With Polysilicon Diodes," IEEE Trans. on Cir. And Sys.—II: Exp. Brief., vol. 54, No. 1, Jan. 2007, pp. 47-51.
Kim, Deok-Kee et al., "An Investigation of Electrical Current Induced Phase Transitions in the NiPtSi/Polysilicon System," J. App. Phy. 103, 073708 (2008).
Kim, I. S. et al., "High Performance PRAM Cell Scalable to sub-20nm Technology with below 4F2 Cell Size, Extendable to DRAM Applications," IEEE VLSI Tech Symp., Jun. 2010, pp. 203-204.
Kim, Jinbong et al., "3-Transistor Antifuse OTP ROM Array Using Standard CMOS Process," IEEE VLSI Cir. Symposium, Jun. 2003, pp. 239-242.
Kim, O. et al., "CMOS trimming circuit based on polysilicon fusing," Elec. Lett. vol. 34, No. 4, pp. 355-356, Feb. 1998.
Klee, V. et al., "A 0.13um Logic-Based Embedded DRAM Technology with Electrical Fuses, Cu Interconnect in SiLK, sub-7ns Random Access Time and its Extension to the 0.10um Generation," IEEE IEDM, 2001, pp. 407-410.
Kothandaramam, C. et al., "Electrically programmable fuse (eFUSE) using electromigration in silicides," IEEE Elec. Dev. Lett., vol. 23, No. 9, pp. 523-525, Sep. 2002.
Kulkarni, S. et al., "High-Density 3-D Metal-Fuse PROM Featuring 1.37um2 1T1R Bit Cell in 32nm High-K Metal-Gate CMOS Technology," VLSI Cir. Symp., Jun. 2009 pp. 28-29.
Kulkarni, S. et al., "A 4Kb Metal-Fuse OTP-ROM Macro Featuring a 2V Programmable 1.37um2 1T1R Bit Cell in 32nm High-K Metal-Gate CMOS," IEEE J. of Sol. Stat. Cir, vol. 45, No. 4, Apr. 2010, pp. 863-868.
Kund, Michael et al., "Conductive Bridging RAM (CBRAM): An Emerging Non-Volatile Memory Technology Scalable to Sub 20nm," IEEE IEDM 2005, pp. 754-757.
Lai, Han-Chao et al., "A 0.26um2 U-Shaped Nitride-Based Programming Cell on Pure 90nm CMOS Technology," IEEE Elec. Dev. Lett. vol. 28, No. 9, Sep. 2007, pp. 837-839.
Lai, S., "Current Status of the Phase Change Memory and Its Future," IEEE IEDM Dig. of Tech. Paper, Dec. 2003, pp. 255-258.
Lee, H. Y. et al., "Low Power and High Speed Bipolar Switching with A Thin Reactive Ti Buffer Layer in Robust HfO2 Based RRAM," IEEE IEDM, 2008, pp. 1-4.
Lee, K.J., et al., "A 90nm 1.8V 512Mb Diode-Switch PRAM with 266MB/s Read Throughout," IEEE ISSCC, Dig. of Tech. Paper, Feb. 2007, 3 pgs.
Lee, Kwang-Jin et al., "A 90nm 1.8V 512Mb Diode-Switch PRAM with 266MB/s Read Throughput," IEEE J. of Sol. Stat. Cir., vol. 43, No. 1, Jan. 2008, pp. 150-162.
Lee, M.-J. et al., "Stack Friendly all-Oxide 3D RRAM Using GaInZnO Peripheral TFT Realized Over Glass Substrates," IEDM, Dec. 2008. pp. 1-4.
Lee, Man Chiu et al., "OTP Memory for Low Cost Passive RFID Tags," IEEE Conf. on Electron Devices and Solid-State Circuits (EDSSC), 2007, pp. 633-636.
Liaw, Corvin et al., "The Conductive Bridging Random Access Memory (CBRAM): A Non-volatile Multi-Level Memory Technology," 37th European Solid-State Device Research Conference (ESSDERC), 2007, pp. 226-229.
Lim, Kyunam et al., "Bit Line Coupling Scheme and Electrical Fuse Circuit for Reliable Operation of High Density DRAM," IEEE VLSI Cir. Symp. Jun. 2001, pp. 33-34.
Maffitt, T. et al., "Design Considerations for MRAM," IBM J. Res. & Dev., vol. 50, No. 1, Jan. 2006, pp. 25-39.
Meng, X.Z. et al., "Reliability Concept for Electrical Fuses," IEE Proc.-Sci Meas. Technol., vol. 144, No. 2, Mar. 1997, pp. 87-92.
Min, Byung-Jun et al., "An Embedded Non-volatile FRAM with Electrical Fuse Repair Scheme and One Time Programming Scheme for High Performance Smart Cards," IEEE CICC, Nov. 2005, pp. 255-258.
Mojumder, N. N. et al., "Three-Terminal Dual-Pillar STT-MRAM for High Performance Robust Memory Applications," IEEE Trans. Elec. Dev. vol. 58. No. 5, May 2011, pp. 1508-1516.
Morimoto, T. et al., "A NiSi Salicide Technology for Advanced Logic Devices," IEEE IEDM, Dec. 1991, pp. 653-656.
Neale, Ron, "PCM Progress Report No. 6 Afterthoughts," http://www.eetimes.com/General/PrintView/4236240, Feb. 13, 2012, 5 pages.
Nebashi, R. et al., "A 90nm 12ns 32Mb 2T1MTJ MRAM," IEEE ISSCC Dig. of Tech. Paper, Sess. 27.4, Feb. 2009, 3 pages.
Ng, K.P. et al., "Diode-Base Gate Oxide Anti-Fuse One-Time Programmable Memory Array in Standard CMOS Process," IEEE Int. Conf. of Elect. Dev. & Solid-Stat Cir. (EDSSC), Dec. 2009, pp. 457-460.
Ohbayashi, Shigeki et al., "A 65nm Embedded SRAM With Wafer Level Burn-In Mode, Leak-Bit Redundancy and Cu E-Trim Fuse for Known Good Die," IEEE J. of Solid. Stat. Cir., vol. 43, No. 1, Jan. 2008, pp. 96-108.
Oh, G. H. et al., "Parallel Multi-Confined (PMC) Cell Technology for High Density MLC PRAM," IEEE VLSI Tech. Symp., Jun. 2009, pp. 220-221.
Oh, J. H. et al., "Full Integration of Highly Manufacturable 512Mb PRAM Based on 90nm Technology," IEEE IEDM Dig. of Tech. Paper, Dec. 2006, pp. 1-4.
Osada, K. et al., "Phase Change RAM Operated with 1.5V CMOS as Low Cost Embedded Memory," IEEE CICC, Nov. 2005, pp. 431-434.

(56) References Cited

OTHER PUBLICATIONS

Park, Don et al., "Study on Reliability of Metal Fuse for Sub-100nm Technology," IEEE Int. Symp. On Semiconductor Manufacturing (ISSM), 2005, pp. 420-421.
Park, Jongwoo et al., "Phase Transformation of Programmed NiSi Electrical Fuse: Diffusion, Agglomeration, and Thermal Stability," 18th IEEE Int. Symp. On Physical and Failure Analysis of Integrated Circuits, (IPFA), 2011, pp. 1-7.
Park, Young-Bae et al., "Design of an eFuse OTP Memory of 8 Bits Based on a 0.35um BCD Process," Mobile IT Convergence (ICMIC), 2011 Int. Conf. on, pp. 137-139.
Pellizzer, F. et al., "Novel uTrench Phase-Change Memory Cell for Embedded and Stand-alone Non-Volatile Memory Applications," IEEE VLSI Tech Symp. Jun. 2004, pp. 18-19.
Peng, J. et al., "A Novel Embedded OTP NVM Using Standard Foundry CMOS Logic Technology," IEEE 21st Non-Volatile Semiconductor Memory Workshop (NVSMW) 2006, pp. 24-26.
Rizzolo, R. F. et al., "IBM System z9 eFUSE applications and methodology," IBM J. Res. & Dev. vol. 51 No. ½ Jan./Mar. 2007, pp. 65-75.
Robson, Norm et al., "Electrically Programmable Fuse (eFuse) from Memory Redundancy to Autonomic Chips," IEEE CICC, 2007, pp. 799-804.
Russo, U. et al., "Conductive-Filament Switching Analysis and Self-Accelerated Thermal Dissolution Model for Reset in NiO-based RRAM," IEDM, Dec. 2007, pp. 775-778.
Safran, J et al., "A Compact eFUSE Programmable Array Memory for SOI CMOS," VLSI Cir. Symp. Jun. 2007, pp. 72-73.
Sasaki, Takahiko et al., "Metal-Segregate-Quench Programming of Electrical Fuse," IEEE 43rd IRPS, 2005, pp. 347-351.
Schrogmeier, P. et al., "Time Discrete Voltage Sensing and Iterative Programming Control for a 4F2 Multilevel CBRAM," VLSI Cir. Symp., Jun. 2007, pp. 186-187.
Sheu, Shyh-Shyuan et al., "A 5ns Fast Write Multi-Level Non-Volatile 1K-bits RRAM Memory with Advance Write Scheme," VLSI Cir. Symp., Jun. 2009, pp. 82-83.
Sheu, Shyh-Shyuan et al., "Fast-Write Resistive RAM (RRAM) for Embedded Applications," IEEE Design & Test of Computers, Jan./Feb. 2011, pp. 64-71.
Shi, Min et al., "Zero-Mask Contact Fuse for One-Time-Programmable Memory in Standard CMOS Processes," IEEE Dev. Lett. vol. 32, No. 7, Jul. 2011, pp. 955-957.
Song, Y. J. et al., "Highly Reliable 256Mb PRAM with Advanced Ring Contact Technology and Novel Encapsulating Technology," IEEE VLSI Tech Symp., Jun. 2006, pp. 153-154.
Suto, Hiroyuki et al., "Programming Conditions for Silicided Poly-Si or Copper Electrically Programmable Fuses," IEEE IIRW Final Report, 2007, pp. 84-89.
Suto, Hiroyuki et al., "Study of Electrically Programmable Fuses Through Series of I-V Measurements," IEEE IIRW Final Report, 2006, pp. 83-86.
Suto, Hiroyuki et al., "Systematic Study of the Dopant-Dependent Properties of Electrically Programmable Fuses With Silicide Poly-Si Links Through a Series of I-V Measurements," IEEE Trans. on Dev. Mat. Rel. vol. 7, No. 2, Jun. 2007, pp. 285-297.
Takaoka, H. et al., A Novel Via-fuse Technology Featuring Highly Stable Blow Operation with Large On-off Ratio for 32nm Node and Beyond, IEDM, 2007, pp. 43-46.
Tehrani, S. et al., "Magnetoresistive Random Access Memory Using Magnetic Tunnel Junction," Proc. of IEEE, vol. 91, No. 5, May 2003, pp. 703-714.
Tehrani, S., "Status and Outlook of MRAM Memory Technology," IEEE IEDM Dig. of Tech Paper., Dec. 2006, pp. 1-4.
Teichmann, J. et al., "One Time Programming (OTP) with Zener Diodes in CMOS Processes," 33rd Conf. on European Solid-State Device Research (ESSDERC), 2003, pp. 433-436.
Tian, C. et al., "Reliability Investigation of NiPtSi Electrical Fuse with Different Programming Mechanisms," IEEE IIRW Final Report, 2007, pp. 90-93.
Tian, C. et al., "Reliability Qualification of CoSi2 Electrical Fuse for 90nm Technology," IEEE 44th IRPS, 2006, pp. 392-397.
Tian, Chunyan et al., "Reliability Investigation of NiPtSi Electrical Fuse with Different Programming Mechanisms," IEEE Trans. on Dev. Mat. Rel. vol. 8, No. 3, Sep. 2008, pp. 536-542.
Tonti, W. R. et al., "Product Specific Sub-Micron E-Fuse Reliability and Design Qualification," IEEE IIRW Final Report, 2003, pp. 36-40.
Tonti, W. R., "Reliability and Design Qualification of A Sub-Micro Tungsten Silicide E-Fuse," IEEE IRPS Proceedings, 2004, pp. 152-156.
Tonti, W. R., "Reliability, Design Qualification, and Prognostic Opportunity of in Die E-Fuse," IEEE Conference on Prognostics and Health Management (PHM), 2011, pp. 1-7.
Ueda, T. et al., "A Novel Cu Electrical Fuse Structure and Blowing Scheme utilizing Crack-assisted Mode for 90-45nm-node and beyond," IEEE VLSI Tech. Sym., Jun. 2006, 2 pages.
Ulman, G. et al., "A Commercial Field-Programmable Dense eFUSE Array Memory with 00.999% Sense Yield for 45nm Soi Cmos", ISSCC 2008/ Session 22 / Variation Compensation and Measurement/ 22.4, 2008 IEEE International Solid-State Circuits Conference, pp. 406-407.
Vimercati, Daniele et al., "A 45nm 1Gbit 1.8V PCM for Wireless and Embedded Applications," IEEE ISSCC Feb. 2010, 26 pages.
Vinson, J. E., "NiCr Fuse Reliability—A New Approach," Southcon/94, Conference Record, 1994, pp. 250-255.
Walko, J., "Ovshinsky's Memories," IEE Review, Issue 11, Nov. 2005, pp. 42-45.
Wang, J. P. et al., "The Understanding of Resistive Switching Mechansim in HfO2-Based Resistive Random Access Memory," IEDM, 2011, pp. 12.1.1-12.1.4.
Wikipedia, "Programmable read-only memory", http://en.wikipedia.org/wiki/Programmable_read-only_memory, downloaded Jan. 31, 2010, 4 pages.
Worledge, D.C., "Single-Domain Model for Toggle MRAM," IBM J. Res. & Dev. vol. 50, No. 1, Jan. 2006, pp. 69-79.
Wu, Kuei-Sheng et al., "The Improvement of Electrical Programmable Fuse with Salicide-Block Dielectrical Film in 40nm CMOS Technology," Interconnect Technology Conference (IITC), 2010 Int. pp. 1-3.
Wu, Kuei-Sheng et al., "Investigation of Electrical Programmable Metal Fuse in 28nm and beyond CMOS Technology," IEEE International Interconnect Technology Conference and 2011 Materials for Advanced Metallization (IITC/MAM), 2011, pp. 1-3.
Yin, M. et al., "Enhancement of Endurance for CuxO based RRAM Cell," 9th Int. Conf. on Solid-State and Integrated-Circuit Technology (ICSICT) 2008, pp. 917-920.
Zhu, Jian-Gang, "Magnetoresistive Random Access Memory: The Path to Competitiveness and Scalability," Proc. Of IEEE, vol. 96, No. 11, Nov. 2008, pp. 1786-1798.
Zhuang, W. W. et al., "Novell Colossal Magnetonresistive Thin Film Nonvolatile Resistance Random Access Memory (RRAM)," IEEE IEDM 2002, pp. 193-196.
Notice of Allowance for U.S. Appl. No. 13/026,664 mailed Sep. 18, 2012.
Office Action for U.S. Appl. No. 13/471,704 mailed Jul. 31, 2012.
Notice of Allowance for U.S. Appl. No. 13/471,704 mailed Oct. 18, 2012.
Notice of Allowance for U.S. Appl. No. 13/026,678 mailed Sep. 19, 2012.
Office Action for U.S. Appl. No. 13/026,783 mailed Sep. 27, 2012.
Office Action for U.S. Appl. No. 13/026,717 mailed Oct. 25, 2012.
Office Action for U.S. Appl. No. 13/026,650 mailed Nov. 9, 2012.
Office Action for U.S. Appl. No. 13/026,692 mailed Nov. 9, 2012.
Office Action for U.S. Appl. No. 13/026,752 mailed Nov. 9, 2012.
Office Action for U.S. Appl. No. 13/026,656 mailed Nov. 13, 2012.
Office Action for U.S. Appl. No. 13/026,704 mailed Nov. 23, 2012.
Office Action for U.S. Appl. No. 13/397,673, mailed Dec. 18, 2012.
Office Action for U.S. Appl. No. 13/026,840, mailed Dec. 31, 2012.
Office Action for U.S. Appl. No. 13/026,852, mailed Jan. 14, 2013.
Restriction Requirement for U.S. Appl. No. 13/026,835, mailed Dec. 12, 2012.

(56) References Cited

OTHER PUBLICATIONS

Notice of Allowance for U.S. Appl. No. 13/026,717, mailed Feb. 12, 2013.
Office Action for U.S. Appl. No. 13/471,704, mailed Jan. 25, 2013.
U.S. Appl. No. 13/761,048, filed Feb. 6, 2013.
U.S. Appl. No. 13/761,057, filed Feb. 6, 2013.
U.S. Appl. No. 13/761,097, filed Feb. 6, 2013.
U.S. Appl. No. 13/761,045, filed Feb. 6, 2013.
Office Action for U.S. Appl. No. 13/026,678, mailed Feb. 20, 2013.
Notice of Allowance for U.S. Appl. No. 13/026,783, mailed Mar. 4, 2013.
Notice of Allowance for U.S. Appl. No. 13/026,692, mailed Mar. 15, 2013.
Notice of Allowance for U.S. Appl. No. 13/026,835, mailed Mar. 20, 2013.
Notice of Allowance for U.S. Appl. No. 13/026,664, mailed Apr. 22, 2013.
Notice of Allowance for U.S. Appl. No. 13/026,656, mailed Apr. 22, 2013.
Jagasivamani et al., "Development of a Low-Power SRAM Compiler", IEEE Press, 2001, pp. 498-501.
Liu et al., "A Flexible Embedded SRAM Compiler", IEEE Press, 2002, 3 pgs.
Sundrararajan, "OSUSPRAM: Design of a Single Port SRAM Compiler in NCSU FREEPDK45 Process", Mater of Science in Electrical Engineering, Oklahoma State University, Jul. 2010, 117 pgs.
Notice of Allowance for U.S. Appl. No. 13/026,835, Mailed Apr. 18, 2013.
Notice of Allowance for U.S. Appl. No. 13/026,704, mailed Apr. 30, 2013.
Notice of Allowance for U.S. Appl. No. 13/026,852, mailed May 10, 2013.
Notice of Allowance for U.S. Appl. No. 13/026,717, mailed May 15, 2013.
Notice of Allowance for U.S. Appl. No. 13/471,704, mailed May 22, 2013.
Notice of Allowance for U.S. Appl. No. 13/026,678, mailed May 28, 2013.
Notice of Allowance for U.S. Appl. No. 13/026,650, mailed May 30, 2013.
Restriction Requirement for U.S. Appl. No. 13/314,444, mailed Jun. 7, 2013.
Restriction Requirement for U.S. Appl. No. 13/214,198, mailed Jun. 13, 2013.
Notice of Allowance for U.S. Appl. No. 13/026,840, mailed Jun. 13, 2013.
Restriction Requirement for U.S. Appl. No. 13/026,771, mailed Jun. 13, 2013.
Notice of Allowance for U.S. Appl. No. 13/026,752, mailed Jul. 1, 2013.
Restriction Requirement for U.S. Appl. No. 13/678,543, mailed Jul. 8, 2013.
Office Action for U.S. Appl. No. 13/026,725, mailed Jul. 19, 2013.
Notice of Allowance for U.S. Appl. No. 13/026,664, mailed Jul. 22, 2013.
Notice of Allowance for U.S. Appl. No. 13/026,692, mailed Jul. 23, 2013.
Notice of Allowance for U.S. Appl. No. 13/397,673, mailed Jul. 30, 2013.
Notice of Allowance for U.S. Appl. No. 13/026,704, mailed Aug. 2, 2013.
Notice of Allowance for U.S. Appl. No. 13/026,783, mailed Aug. 5, 2013.
Office Action for U.S. Appl. No. 13/214,198, mailed Aug. 6, 2013.
Office action for Chinese Patent Application No. 201110279954.7, mailed Jul. 1, 2013.
Shen et al., "High-K Metal Gate Contact RRAM (CRRAM) in Pure 28 nm CMOS Logic Process", Electron Devices Meeting (IEDM), 2012 IEEE International, Dec. 2012, 4 pgs.
Tseng et al., "A New High-Density and Ultrasmall-Cell Size Contact RRAM (CR-RAM) with Fully CMOS-Logic-Compatible Technology and Circuits", IEEE Transactions on Electron Devices, vol. 58, Issue 1, Jan. 2011, 6 pgs.
Office Action for U.S. Appl. No. 13/026,783, mailed Sep. 9, 2013.
Office Action for U.S. Appl. No. 13/314,444, mailed Sep. 9, 2013.
Office Action for U.S. Appl. No. 13/026,771, mailed Sep. 9, 2013.
Notice of Allowance for U.S. Appl. No. 13/026,852, mailed Sep. 18, 2013.
Office Action (Ex Parte) for U.S. Appl. No. 13/678,543, mailed Sep. 20, 2013.
Office Action for U.S. Appl. No. 13/835,308, mailed Sep. 27, 2013.
Notice of Allowance for U.S. Appl. No. 13/026,717, mailed Oct. 1, 2013.
Office Action for U.S. Appl. No. 13/954,831, mailed Oct. 1, 2013.
Notice of Allowance for U.S. Appl. No. 13/026,656, mailed Oct. 4, 2013.
Office Action for U.S. Appl. No. 13/214,183, mailed Oct. 25, 2013.
Chua, "Many Times Programmable z8 Microcontroller", e-Gizmo.cim, Nov. 21, 2006, pp. 1-5.
Forum, Intel Multi-byte Nops, asmcommunity.net, Nov. 21, 2006, pp. 1-5.
CMOS Z8 OTP Microcontrollers Product Specification, Zilog Inc., May 2008, Revision 1, pp. 1-84.
OTP Programming Adapter Product User Guide, Zilog Inc., 2006, pp. 1-3.
Notice of Allowance for U.S. Appl. No. 13/026,852, mailed Nov. 15, 2013.
Notice of Allowance for U.S. Appl. No. 13/026,835, mailed Nov. 22, 2013.
Notice of Allowance for U.S. Appl. No. 13/026,725, mailed Dec. 10, 2013.
Office Action for U.S. Appl. No. 13/026,783, mailed Dec. 23, 2013.
Notice of Allowance for U.S. Appl. No. 13/026,771, mailed Jan. 15, 2014.
Office Action for Chinese Patent Application No. 201110244362.1, mailed Sep. 29, 2013.
Office Action for Chinese Patent Application No. 201110235464.7, mailed Oct. 8, 2013.
Office Action for Chinese Patent Application No. 201110244400.3, mailed Nov. 5, 2013.
Office Action for Chinese Patent Application No. 201110244342.4, mailed Oct. 31, 2013.
Restriction Requirement for U.S. Appl. No. 13/678,541, mailed Feb. 28, 2014.
Notice of Allowance for U.S. Appl. No. 13/026,840, mailed Mar. 6, 2014.
Notice of Allowance for U.S. Appl. No. 13/026,840, mailed Mar. 10, 2014.
Notice of Allowance of U.S. Appl. No. 13/678,543, mailed Dec. 13, 2013.
Notice of Allowance for U.S. Appl. No. 13/835,308, mailed Mar. 14, 2014.
Notice of Allowance for U.S. Appl. No. 13/026,835, mailed Mar. 14, 2014.
Notice of Allowance for U.S. Appl. No. 13/026,725, mailed Mar. 31, 2014.
Notice of Allowance for U.S. Appl. No. 13/026,852, mailed Mar. 20, 2014.
Notice of Allowance for U.S. Appl. No. 13/026,771, mailed Mar. 18, 2014.
Final Office Action for U.S. Appl. No. 13/214,183, mailed Apr. 17, 2014.
"Embedded Systems/Mixed C and Assembly Programming", Wikibooks, Aug. 6, 2009, pp. 1-7.
Notice of Allowance for U.S. Appl. No. 13/761,097, mailed Jul. 15, 2014.
Office Action for U.S. Appl. No. 13/571,797, mailed Apr. 24, 2014.
Notice of Allowance for U.S. Appl. No. 13/590,044, mailed Apr. 29, 2014.
Notice of Allowance for U.S. Appl. No. 13/954,831, mailed May 27, 2014.

(56) References Cited

OTHER PUBLICATIONS

Notice of Allowance of U.S. Appl. No. 13/833,044, mailed May 29, 2014.
Notice of Allowance for U.S. Appl. No. 13/761,048, mailed Jun. 10, 2014.
Office Action for Taiwanese Patent Application No. 100129642, mailed May 19, 2014 (with translation).
Office Action for U.S. Appl. No. 13/072,783, mailed Nov. 7, 2013.
Notice of Allowance for U.S. Appl. No. 13/026,840, mailed Jun. 24, 2014.
Notice of Allowance for U.S. Appl. No. 13/214,198, mailed Jun. 23, 2014.
Notice of Allowance for U.S. Appl. No. 13/590,044, mailed Jun. 23, 2014.
Ker et al., "MOS-bounded diodes for on-chip ESD protection in a 0.15-μm shallow-trench-isolation salicided CMOS Process" International Symposium on VLSI Technology, Systems and Applications, 2003, 5 pgs.
Notice of Allowance for U.S. Appl. No. 13/840,965, mailed Jun. 25, 2014.
Office Action for U.S. Appl. No. 13/970,562, mailed Jun. 27, 2014.
Office Action for U.S. Appl. No. 13/835,308, mailed Jun. 27, 2014.
Notice of Allowance for U.S. Appl. No. 13/288,843, mailed Jul. 8, 2014.
Restriction Requirement for U.S. Appl. No. 13/678,539, mailed Jul. 1, 2014.
Notice of Allowance for U.S. Appl. No. 14/231,413, mailed Jul. 18, 2014.
Notice of Allowance for U.S. Appl. No. 13/590,044, mailed Jul. 23, 2014.
Restriction Requirement for U.S. Appl. No. 13/833,067, mailed Jul. 11, 2014.
Notice of Allowance for U.S. Appl. No. 13/954,831, mailed Aug. 4, 2014.
Restriction Requirement for U.S. Appl. No. 13/678,544, mailed Aug. 1, 2014.
Notice of Allowance for U.S. Appl. No. 13/761,097, mailed Jul. 25, 2014.
Ex parte Quayle for U.S. Appl. No. 13/761,057, mailed Aug. 8, 2014.
Final Office Action for U.S. Appl. No. 13/314,444, mailed May 14, 2014.
Corrected Notice of Allowability for U.S. Appl. No. 13/288,843, mailed Aug. 19, 2014.
Office Action for U.S. Appl. No. 13/590,049, mailed Aug. 29, 2014.
Ex Parte Quayle for U.S. Appl. No. 13/590,047, mailed Aug. 29, 2014.
Ex Parte Quayle for U.S. Appl. No. 13/590,050, mailed Sep. 3, 2014.
Office Action for U.S. Appl. No. 13/678,544, mailed Sep. 12, 2014.
Office Action for U.S. Appl. No. 13/678,539, mailed Sep. 10, 2014.
Notice of Allowance for U.S. Appl. No. 13/288,843, mailed Sep. 18, 2014.
Notice of Allowance for U.S. Appl. No. 13/761,057, mailed Sep. 26, 2014.
Notice of Allowance for U.S. Appl. No. 13/833,044, mailed Sep. 24, 2014.
Notice of Allowance for U.S. Appl. No. 13/314,444, mailed Sep. 24, 2014.
Office Action for U.S. Appl. No. 13/761,045, mailed Sep. 30, 2014.
Notice of Allowance for U.S. Appl. No. 13/835,308, mailed Oct. 10, 2014.
Notice of Allowance for U.S. Appl. No. 13/571,797, mailed Oct. 14, 2014.
Office Action for U.S. Appl. No. 13/833,067, mailed Oct. 20, 2014.
Notice of Allowance for U.S. Appl. No. 14/085,228, mailed Oct. 23, 2014.
Office Action for U.S. Appl. No. 13/842,824, mailed Oct. 29, 2014.
Herner et al., "Vertical p-i-n Polysilicon Diode with Antifuse for stackable Field-Programmable Rom", IEEE Electron Device Letters, vol. 25, No. 5, pp. 271-273, May 2004.
Notice of Allowance for U.S. Appl. No. 13/590,049, mailed Nov. 25, 2014.
Notice of Allowance for U.S. Appl. No. 13/590,047, mailed Nov. 24, 2014.
Office Action for U.S. Appl. No. 13/590,044, mailed Dec. 9, 2014.
Notice of Allowance for U.S. Appl. No. 13/590,050, mailed Dec. 18, 2014.
Office Action for U.S. Appl. No. 14/042,392, mailed Dec. 31, 2014.
Office Action for U.S. Appl. No. 14/071,957, mailed Dec. 29, 2014.
International Search Report and Written Opinion for International Patent Application No. PCT/US/2014/056676, mailed Dec. 19, 2014.
Office Action for U.S. Appl. No. 14/493,083, mailed Jan. 8, 2015.
Office Action for Chinese Patent Application No. 2011102443903, mailed Dec. 16, 2014 (with translation).
Notice of Allowance for U.S. Appl. No. 13/970,562, mailed Jan. 23, 2015.
Notice of Allowance for U.S. Appl. No. 14/493,069, mailed Feb. 17, 2015.
Notice of Allowance for U.S. Appl. No. 14/085,228, mailed Feb. 18, 2015.
Notice of Allowance for U.S. Appl. No. 13/761,045, mailed Feb. 18, 2015.
Notice of Allowance for U.S. Appl. No. 14/231,404, mailed Jan. 22, 2015.
Notice of Allowance for U.S. Appl. No. 14/021,990, mailed Dec. 9, 2014.
Final Office Action for U.S. Appl. No. 13/678,544, mailed Feb. 15, 2015.
Office Action for U.S. Appl. No. 14/101,125, mailed Mar. 6, 2015.
Hassan, "Argument for anti-fuse non-volatile memory in 28nm high-k metal gate", Feb. 15, 2011, wwwl.eeetimes.com publication.
Office Action for U.S. Appl. No. 13/026,783, mailed on Mar. 5, 2015.
Final Office Action for U.S. Appl. No. 13/678,539, mailed Apr. 1, 2015.
Office Action for U.S. Appl. No. 14/636,155, mailed on Apr. 10, 2015.
Notice of Allowance for U.S. Appl. No. 14/021,990, mailed Apr. 14, 2015.
Notice of Allowance for U.S. Appl. No. 13/842,824, mailed Apr. 14, 2015.
Notice of Allowance for U.S. Appl. No. 14/071,957, mailed Apr. 14, 2014.
Notice of Allowance for U.S. Appl. No. 14/231,404, mailed Apr. 17, 2015.
Notice of Allowance for U.S. Appl. No. 13/590,444, mailed May 12, 2015.
Notice of Allowance for U.S. Appl. No. 13/072,783, mailed May 13, 2015.
Notice of Allowance for U.S. Appl. No. 13/833,067, mailed Jun. 5, 2015.
Office Action for U.S. Appl. No. 13/314,444, mailed Dec. 10, 2014.
Final Office Action for U.S. Appl. No. 13/026,783, mailed Jul. 30, 2015.
Notice of Allowance for U.S. Appl. No. 14/553,874, filed Aug. 10, 2015.
Office Action for U.S. Appl. No. 14/500,743, mailed Aug. 17, 2015.
Notice of Allowance for U.S. Appl. No. 14/042,392, mailed Aug. 21, 2015.
Office Action for U.S. Appl. No. 14/485,696, mailed Aug. 20, 2015.
Notice of Allowance for U.S. Appl. No. 14/493,083, mailed Aug. 27, 2015.
Office Action for U.S. Appl. No. 13/678,539, mailed Sep. 16, 2015.
Office Action for U.S. Appl. No. 14/507,691, mailed Oct. 30, 2015.
Final Office Action for U.S. Appl. No. 14/101,125, mailed Nov. 17, 2015.
Notice of Allowance for U.S. Appl. No. 13/072,783, mailed Oct. 27, 2015.
Office Action for U.S. Appl. No. 14/792,479, mailed Aug. 28, 2015.

(56) References Cited

OTHER PUBLICATIONS

Notice of Allowance for U.S. Appl. No. 14/500,743, mailed Dec. 2, 2015.
Notice of Allowance for U.S. Appl. No. 14/636,155, mailed Dec. 4, 2015.
Notice of Allowance for U.S. Appl. No. 14/071,957, mailed Dec. 4, 2015.
Notice of Allowance for U.S. Appl. No. 13/678,544, mailed Feb. 12, 2016.
Office Action for U.S. Appl. No. 14/749,392, mailed Feb. 25, 2016.
Office Action for U.S. Appl. No. 14/940,012, mailed Feb. 26, 2016.
Notice of Allowance for U.S. Appl. No. 14/485,698, mailed Mar. 1, 2016.
Notice of Allowance for U.S. Appl. No. 14/507,691, mailed Mar. 15, 2016.
Final Office Action for U.S. Appl. No. 13/314,444, mailed Dec. 8, 2011.
Final Office Action for U.S. Appl. No. 13/678,539, mailed Apr. 8, 2016.
Notice of Allowance for U.S. Appl. No. 14/545,775, mailed Apr. 12, 2016.
Final Office Action for U.S. Appl. No. 14/101,125, mailed Apr. 21, 2016.
Notice of Allowance for U.S. Appl. No. 14/500,743, mailed Arpil 26, 2016.
Notice of Allowance for U.S. Appl. No. 14/749,392, mailed Jun. 27, 2016.
Notice of Allowance for U.S. Appl. No. 14/940,012, mailed Jul. 15, 2016.
Office Action for U.S. Appl. No. 14/985,095, mailed Jul. 21, 2016.
Notice of Allowance for U.S. Appl. No. 13/314,444, mailed Aug. 5, 2016.
Notice of Allowance for U.S. Appl. No. 14/485,696, mailed Sep. 21, 2016.
Notice of Allowance for U.S. Appl. No. 15/076,460, mailed Dec. 5, 2016.
Final Office Action for U.S. Appl. No. 14/101,125, mailed Dec. 14, 2016.
Office Action for U.S. Appl. No. 15/297,922, mailed Dec. 23, 2016.
Office Action for U.S. Appl. No. 15/270,287, mailed Dec. 23, 2016.
Final Office Action for U.S. Appl. No. 13/678,539, mailed Feb. 8, 2017.
Notice of Allowance for U.S. Appl. No. 15/076,460, mailed Mar. 15, 2017.
Office Action for U.S. Appl. No. 15/422,266, mailed Mar. 17, 2017.
Office Action for U.S. Appl. No. 15/365,584, mailed Apr. 21, 2017.
Notice of Allowance for U.S. Appl. No. 14/485,696, mailed May 25, 2017.
Notice of Allowance for U.S. Appl. No. 14/101,125, mailed Jul. 10, 2017.
Notice of Allowance for U.S. Appl. No. 15/076,460, mailed Jul. 20, 2017.
Final Office Action for U.S. Appl. No. 14/485,698, mailed Jul. 24, 2017.
Renewed Final Office Action for U.S. Appl. No. 14/485,698, mailed Aug. 2, 2017.
Office Action for Taiwanese Patent Application No. 102145000, mailed Jul. 7, 2017. (with translations).
Office Action for Chinese Patent Application No. 201410486754.2 mailed Jul. 10, 2017. (with translations).
Final Office Action for U.S. Appl. No. 15/422,266, mailed Sep. 12, 2017.
Notice of Allowance for U.S. Appl. No. 15/365,584, mailed Sep. 13, 2017.
Notice of Allowance for U.S. Appl. No. 14/485,698, mailed Oct. 16, 2017.
Final Office Action for U.S. Appl. No. 15/422,266, mailed Jan. 22, 2018.
Notice of Allowance for U.S. Appl. No. 14/485,698, mailed Feb. 15, 2018.
Extended Search Report for EP Application No. 14901820, mailed Jun. 23, 2017.
Office Action for U.S. Appl. No. 15/884,362, mailed May 4, 2018.
Extended European Search Report for EP Application No. 18151106.4, mailed Apr. 6, 2018.
Tonti, "Reliability, design qualification, and prognostic opportunity of in due E-Fuse" Prognostics and Heath Management IEEE Conference Jun. 20, 2011, pp. 1-7.
Office Action for U.S. Appl. No. 15/805,109, mailed May 29, 2018.
Office Action for U.S. Appl. No. 14/485,698, mailed Jun. 21, 2018.
Notice of Allowance for U.S. Appl. No. 15/884,362 mailed Sep. 19, 2018.
Notice of Allowance for U.S. Appl. No. 15/708,116 mailed Oct. 26, 2018.
Notice of Allowance for U.S. Appl. No. 14/485,698 mailed Dec. 10, 2018.
Office Action for U.S. Appl. No. 15/953,422, mailed Jan. 28, 2019.
Final Office Action for U.S. Appl. No. 15/953,422, mailed May 14, 2019.
Office Action for U.S. Appl. No. 15/805,109, mailed Jun. 26, 2019.
Office Action for U.S. Appl. No. 16/245,223, mailed Aug. 8, 2019.
Notice of Allowance for U.S. Appl. No. 15/953,422, mailed Sep. 5, 2019.
Notice of Allowance for U.S. Appl. No. 15/805,109, ailed Nov. 27, 2019.
Office Action for U.S. Appl. No. 16/273,023, mailed Nov. 27, 2019.
Notice of Allowance for U.S. Appl. No. 16/191,429 mailed Dec. 9, 2019.
EP Office Action for EP 1605289.6 mailed Nov. 19, 2019.
EP Search Report 14901820.2, mailed Jun. 23, 2017.
Notice of Allowance for U.S. Appl. No. 16/273,023, mailed Mar. 2, 2020.
Notice of Allowance for U.S. Appl. No. 16/559,560, mailed Mar. 18, 2020.
CN Office Action for 2014800519492, mailed Mar. 8, 2019.
CN Office Action for 2014800519492, mailed Aug. 28, 2019.
TW Office Action for 103132546 mailed Apr. 25, 2016.
TW Search Report 103 132546 mailed Apr. 25, 2016.
EP Extended Search Report for EP 181511064.4 mailed Apr. 6, 2018.
Office Action for U.S. Appl. No. 16/799,809, mailed Sep. 18, 2020.
Notice of Allowance for U.S. Appl. No. 16/803,992, amiled Oct. 7, 2020.
Office Action for U.S. Appl. No. 16/931,314, mailed Oct. 29, 2020.
Examination Report for GB 2013530.7 dated Nov. 25, 2020.
Search Report for GB 20135307 dated Nov. 24, 2020.
Notice of Allowance for U.S. Appl. No. 16/931,314, mailed Mar. 10, 2021.
Office Action for US Patent No. U.S. Appl. No. 17/373,733 mailed Sep. 7, 2022.
Office Action for U.S. Appl. No. 17/584,297, mailed Jul. 13, 2023.
Li, Zonglin, Simulation and Experiment of Wide Bandgap Material based Nonvolatile Memory, University of California, Riverside, All pages, 2012.
Non-Final Office Action for U.S. Appl. No. 17/584,297, mailed Nov. 28, 2023.
Taiwanese Office Action for TW Patent Application No. 111103202, mailed Nov. 6, 2023. (with translations).

\* cited by examiner

PHYSICALLY UNCLONABLE FUNCTION PRODUCED USING OTP MEMORY

CROSS REFERENCE TO RELATED APPLICATION

This application claims priority to U.S. Provisional Patent Application No. 63/195,709, filed Jun. 1, 2021, and entitled "PHYSICALLY UNCLONABLE FUNCTION PRODUCED USING OTP MEMORY," the content of which is hereby incorporated by reference.

BACKGROUND OF THE INVENTION

Physically Unclonable Function ("PUF") is a device to generate a unique chip ID or security key based on manufacturing random variations, which is almost unique and indistinguishable to every chip. Normally, device variations during manufacturing are undesirable effects, as an integrated circuit fabricated on the same dice, same wafers, or lots are expected to have identical properties to achieve highest yield and predictable performance. However, the natural imperfection of manufacturing variations can be amplified and explored to serve a constructive purpose, that is, to uniquely identify a device.

A PUF device can create a "digital fingerprint", namely, a unique random data pattern naturally created after fabrication to identify a device. Using an intrinsically built-in fingerprint on a chip can advantageously eliminate the additional steps of key injection, for creating a key based on external data and external means, which is insecure and costly. There are many intrinsic device/process variation parameters that can be used to build a PUF, i.e., timing delay, threshold voltage variation, bi-stable state, device mismatch, contact/via formation, or combination thereof. There are also many device parameters that can be programmed after fabrication to build a PUF in any type of nonvolatile memory, including, for example, OTP, MTP, Flash, RRAM, PCRAM, or MRAM, etc.

Some background information about PUFs can be referred to Thomas McGrath, et al., "A PUF Taxonomy," in Applied Physics Reviews, 6, 011303 (2019) and a book by Roel Maes, "Physically Unclonable Functions: Constructions, Properties and Applications" by Springer, 2013.

FIG. 1 shows an arbiter PUF 10 to explore minute propagation delay variations as entropy source (source of randomization), The PUF 10 has an N-stage of multiplexers 12-1, 12-2, to 12-$n$ and a final arbiter stage. Each stage 12-$i$ (i=1, 2, ..., n) has two multiplexers to select the input either from the upper or lower path depending on the input, Challenge[i], and the variations in propagation delays. The multiplexer stage 12-$i$ can be cascaded n times to increase randomization. The last stage arbiter 19 is a phase comparator (e.g., latching one data while using the other as an enable) to generate an output, response. There are some variants, such as ring-oscillator PUF, that belong to this category.

FIG. 2 shows a portion of a block diagram of a bi-stable PUF 20. The circuit 20 has two cross-coupled inverters 21 and 22. This bi-stable device has two output nodes, A and B. If the device is built with perfect device matches, the probability of node A reaching VDD or 0 is 50%. But due to manufacturing imperfection, node A may be initialized to VDD more likely than to 0V. Thus, a random variation can be explored to identify a device uniquely. SRAM PUF, latch PUF, or latch-type of sense amplifier PUF are variants of the bi-stable PUFs. Another variant is to vary initialization conditions, such as write pulse width on a wordline, so as to generate different randomized output in an SRAM PUF.

Another PUF category is based on programming a Non-Volatile Memory (NVM) to create randomized data patterns for each chip. The NVM can be OTP (One-Time Programmable), MTP (Multiple-Time Programmable), flash, RRAM, PCRAM, or MRAM, etc. Some of the NVMs are not available in standard CMOS processes that need additional masks or processing steps. Some of the NVMs need high voltage to program/read or special program controls that are not easy to use.

No matter what kinds of randomness sources are used to build a PUF, an ideal PUF should have the following properties:

(1) Security. A PUF should be secure from any kinds of attacks, either non-invasive, semi-invasive, or invasive attacks. The PUB should be immune from unauthorized accesses and unauthorized alternation.

(2) Uniqueness. The data generated in a PUF should be unique to any other PUFs generated in the other chips, wafers, or lots.

(3) Randomness. The probability of data 0 and 1 should be close to 50% ideally and to satisfy NIST requirements for randomness.

(4) Reliability. The data generated from a PUF should be read with the same data whenever needed in regardless of different environments, such as noise, temperature, supply voltage, humidity, and aging. The data read should also be independent of input signal voltage range or ramping rate. The aging can be due to different kinds of device degradations, such as HCI (Hot Carrier Injection), TDDB (Time Dependent-Dielectric Breakdown), or NBTI (Negative Bias Temperature Instability), etc.

(5) Implementation efficient. The ideal PUF should be based on standard CMOS manufacturing process without any additional masks or processing steps. Small area, low active/standby power consumption, and high speed are figures of merit in VLSI implementation.

It is very hard to meet all the PUF requirements listed above. Some requirements even contradict other requirements. Normally, if the minute manufacturing imperfection can be amplified and explored to use to identify a device, the data readout would not be repeatable. The BER (bit error rate) of any volatile PUF after rough processing is about 2-3% that needs very sophistically ECC (Error Correction Code), such as BCH (192,131,18), to reach ~5 ppb (parts per billion). If the PUF data are extracted for key generation, the data read should be with 0 error rate. Most ECC needs helper data stored in NVMs. Helper data consumes additional silicon area and can leak information. Ironically, some PUFs claim their data will be generated on the fly without any storage but they require NVMs to store helper data for ECC. Though the time-delay PUFs have many Challenge-Response Pairs CRP (input-output pairs), the PUF data can be hacked by machine learning. By feeding and monitoring a few CRPs, a model can be built to predict any outcome of different CRPs based on artificial intelligence type of algorithm with high accuracy. The silicon area of arbiter or ring-oscillator PUFs tend to be larger and more power-hungry than bi-stable based PUFs. Most of NVMs are not available in standard CMOS processes and have severe reliability issues that need to rely on redundancy or ECC for practical uses. Using the unreliable NVMs as a PUF defeats the purposes. Moreover, some NVMs need very high voltage to program that require charge pumps. This causes silicon area, power consumption, and more difficulty to put to practical use. Thus, there is a continuing need for improvements to PUFs to better meet the ideal PUF requirements.

SUMMARY

Embodiments of devices and techniques for generating Physical Unclonable Function (PUF) values using One-Time-Programmable ("OTP") memory are disclosed. The PUF devices can be fabricated using standard CMOS logic processes to reduce size and power for high security and robustness digital fingerprint of a chip.

In one embodiment, an OTP PUF device can be designed with an OTP memory, via reliable and randomized data programming method, weak bit mask, data randomization, and/or hash function. The OTP memory can have a plurality of OTP cells that have at least one OTP element and at least one selector. The OTP element can be a fuse built of polysilicon, silicided polysilicon, CMOS gate, metal, metal-gate, local interconnect, fin structure, or thermally isolated active region. The selector can be a MOS, diode, or bipolar device. The OTP element used for the PUF device should have the program status not detectable by externally optical or electrical means and the OTP element needs to be extremely reliable. The reliable program method is to program the fuse below a thermal runaway condition. In one embodiment, program pre-conditions can be a fixed or randomized program voltage or time around electro-migration (EM) threshold to generate random data. In another embodiment, program pre-conditions can be from another entropy source, such as bi-stability of bi-stable cells, which can be used to harden the data and stored in the OTP memory. The weak bit masking can be used to screen and mark any bits of OTP elements that are not able to be reliably read. Moreover, additional randomization can be used to further increase the randomness of the data to create nearly 50% of data 1 and 0 by post-processing. Finally, a hash function can be used to further scramble the data to achieve high quality of PUF and can also be used for key generation.

The invention can be implemented in numerous ways, including as a method, system, device, or apparatus. Several embodiments of the invention are discussed below.

As a method for generating PUF data in an integrated circuit, one embodiment can, for example, include at least: providing a plurality of OTP cells, that at least one of the OTP cells can be programmed using a program voltage; providing at least one entropy source to generate data to be programmed into the OTP cells: and programming at least one of the OTP cells into a different logic state using the generated data from the entropy source. The programmed data into the at least one of the OTP cells can be used as PUF data for the integrated circuit.

As an electronic device for producing a Physically Unclonable Function (PUF) value, one embodiment can, for example, include at least: at least one OTP memory that can be programmed using a program voltage that is below a maximum program voltage; and at least one entropy source to provide data to be programmed into the OTP memory. The PUF value being produced can be based on at least programming the data from the at least one entropy source into the at least one OTP memory.

As an OTP PUF that has at least one One-Time Programmable (OTP) memory, one embodiment can, for example, include at least a plurality of OTP cells. At least one of the OTP cells can include at least: an OTP element including at least an electrical fuse coupled to a first supply voltage line; and a program selector coupled to the OTP element and to a second supply voltage line. The OTP element can be configured to be programmable by applying voltages to the first and second supply voltage lines and/or by turning on the program selector to thereby change the OTP element into a different logic state. As for a reliable programming method, the OTP can be characterized programming successfully between minimum and maximum program voltages, which are electro-migration (EM) and thermal runaway thresholds. The programming condition can be around the minimum program voltage or time that all OTP bits will be programmed at least once, whether programmed successfully or not. As a result, the program states will not be easily detectable by optical, SEM, or TEM inspection. In another embodiment, the program voltage and/or time can be randomized with a distribution, such as Gaussian distribution. In yet another embodiment, the program method can be from another entropy sources by programming deterministically to harden the data and stored in the OTP memory. The weak bit mask is to screen the unstable bits that are hard to be determined as 0 or 1 reliably. In one embodiment, the OTP memory can be designed with more than one reference resistor, such as Ref−, Ref, and Ref+, with increasing reference resistance. Only reads with Ref and Ref+ both passed can be determined as 1. Similarly, only reads with Ref− and Ref both passed can be determined as 0. Those bits failed to meet the requirements will be discarded. Data can be randomized by post processing, such as exclusive OR (XOR) a plurality of bits to generate one single bit output as an example. Finally, a hash function, such as MD5 can have output widely changed with a slightly difference in the input, can be used to further scramble the data. The procedure can be repeated to generate sufficient bits for a PUF. Furthermore, the output from the hash function can be used as security keys. After the PUF bit stream generation is finished, at least one lock bit can be programmed to disable any future programming so as to prevent any data from unauthorized tampering.

As an electronics system, one embodiment can, for example, include at least: a processor, and a PUF operatively connected to the processor. The PUF can include at least one OTP memory. The OTP memory can include a plurality of OTP cells, and at least one of the OTP cells includes at least: an OTP element including at least one electrical fuse operatively coupled to a first supply voltage line, and a program selector coupled to the OTP element and to a second supply voltage line. The OTP element can be configured to be programmable by applying voltages to the first and second supply voltage lines and/or by turning on the program selector and thereby change the OTP element into a different logic state. The OTP used for PUF should have the program status not detectable by externally optical or electrical means and the OTP needs to be extremely reliable. The OTP memory can be programmed reliably between a minimum and a maximum program voltage, corresponding to electro-migration and thermal runaway conditions. Then, the OTP can be programmed around the minimum voltage/time that all OTP bits will be programmed at least once to hide the program status. Some bits can be programmed successfully and some are not to create randomized data. In another embodiment, the program voltage or time can vary with certain distributions, such as Gaussian, to further randomize the data. In yet another embodiment, the data to be programmed can be from another entropy sources but are hardened and stored into the OTP memory. After the programming is finished, any bits marginally programmed should be detected and prevented from further uses. This can be designed with more than one reference resistor, such as Ref−, Ref, and Ref+, with increasing reference resistance. Only reads with Ref and Ref+ both passed can be determined as 1. Similarly, only reads with Ref− and Ref both passed can be determined as 0. Those bits failed to meet the requirements will be discarded. Data can be further randomized by post-processing, such as exclusively ORing (XOR) a plurality of bits to generate one single bit output, for example. Finally, a hash function, such as MD5 that can create output widely changed with slightly input difference, can be applied to further scramble the bits. This procedure can be repeated to generate a bit stream of data for a PUF. Furthermore, the output from the hash function can be used as security keys. After all bits are generated, at least one lock bit can be programmed to disable any future programming so as to prevent any data from unauthorized tampering.

As a method for operating an OTP PUF, one embodiment can, for example, include at least one OTP memory: providing a plurality of OTP cells, at least one of the OTP cells includes at least (i) an OTP element including at least one electrical fuse coupled to a first supply voltage line, and (ii) a program selector coupled to the OTP element and to a second supply voltage line, and one-time programming a logic state into the at least one of the OTP cells by applying voltage to the first and the second voltage lines and/or by turning on the program selector. The program status of the OTP should not be detectable by externally optical or electrical means and the OTP needs to be extremely reliable to serve for a PUF. The OTP memory can be characterized to be programmed reliably between a minimum and maximum program voltages, corresponding to electro-migration (EM) and thermal run-away thresholds, respectively. The OTP can be programmed around the minimum voltage/time so that all bits will be programmed at least once to hide the program status. In one embodiment, the OTP bits can be programmed within fixed program voltage and/or time ranges to generate randomized data. In another embodiment, the program voltage or time can be near the minimum voltage or time but with a distribution, such as Gaussian, to further randomize the data. In yet another embodiment, the program data can be from another entropy sources but to harden the data onto the OTP memory. Any bits that are hard to be identified as either 0 or 1 should be discarded. One embodiment is to design a sensing circuit with more than one reference resistor, such as Ref−, Ref, and Ref+, with increasing reference resistance. Only reads with Ref and Ref+ both passed can be determined as 1. Similarly, only reads with Ref− and Ref both passed can be determined as 0. Those bits failed to meet the requirements will be marked and discarded for use later. Data can be randomized by post-processing, such as exclusive ORing (XOR) a plurality of bits to generate one single bit output for example. Finally, the bit stream can be further scrambled by a hash function, such as MD5. This procedure can be repeated to generate sufficient bit stream of data for a PUF. Furthermore, the output from the hash function can be used as security keys. After bit stream generation is finished, at least one lock bit can be programmed to disable any future programming and to prevent any data from unauthorized tampering.

BRIEF DESCRIPTION OF THE DRAWINGS

The present invention will be readily understood by the following detailed descriptions in conjunction with the accompanying drawings, wherein like reference numerals designate like structural elements, and in which.

DETAILED DESCRIPTION OF EMBODIMENTS OF THE INVENTION

Embodiments disclosed herein use an OTP memory as a Physically Unclonable Function (PUF). In one embodiment, an OTP PUF can be designed with an OTP memory, programmed with randomized data or entropy sources, weak bits masked, further randomized data, and/or hash function. The OTP memory has a plurality of OTP cells that have at least one OTP element and selector. The OTP element can be a fuse built of polysilicon, silicided polysilicon, CMOS gate, metal, metal-gate, local interconnect, fin structure, or thermally isolated active region. The selector can be a MOS, diode, or bipolar device. The OTP used for PUF should have a program status that is not detectable by external optical or electrical means and should be extremely reliable. One suitable reliable programming method is to program the fuse around an electromigration (EM) threshold and below a thermal run-away condition. The program conditions can be a fixed or randomized voltage/time around the EM threshold to generate randomized data. In another embodiment, the program conditions can be from another entropy source, such as a bi-stable cell initialized into randomized states, to harden the data into OTP. Weak bit masking can be used to screen and mark any unstable bits that cannot be read reliably. Data can be further randomized so as to increase the entropy to reach nearly 50% of data 1 and 0. This can be achieved by exclusive ORing a plurality of bits to generate a single bit output in a post-processing. Finally, a hash function, such as MD5, can be used to create output data that changes widely with a slight input difference that can be applied to further scramble the data. Furthermore, the hash output can be used for security keys. After all the bits are generated for PUF, at least one lock bit can be programmed to disable any further programming so as to prevent unauthorized tampering.

Embodiments of the invention are discussed below with reference to the figures. However, those skilled in the art will readily appreciate that the detailed description given herein with respect to these figures is for explanatory purposes as the invention extends beyond these limited embodiments.

Figure 1:
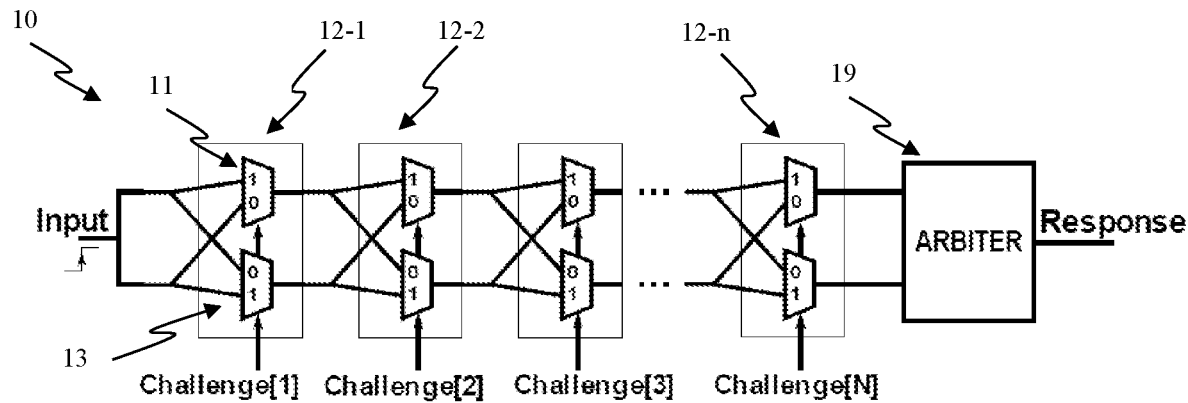
FIG. 1 shows a portion of a schematic diagram of a conventional arbiter PUF.
Figure 2A:
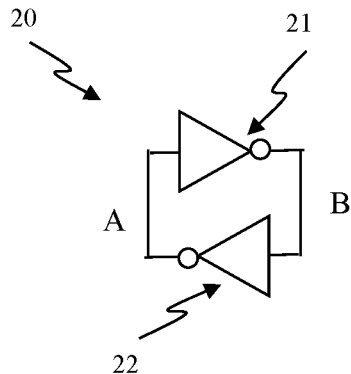
FIG. 2 shows a portion of a schematic diagram of a conventional bi-stable PUF
Figure 3A:
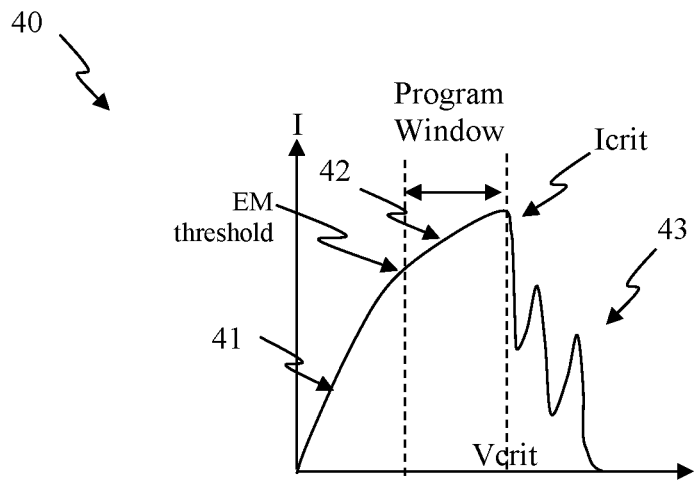
FIG. 3(a) shows an I-V characteristics of programming a fuse.

FIG. 3(a) shows an I-V characteristic of programming a fuse. When a voltage is applied to a fuse, there will be a current flowing through the fuse. The inversion of the I-V curve slope when the voltage is very low is the initial fuse resistance. As the voltage is increased, more current will flow through the fuse. Higher current can generate more Joule heat to raise the temperature so as to increase the fuse resistance. As a result, the curve is bent toward the X-axis following the segment of curves 41. When the programming current is higher enough, electromigration (EM) can happen so that the fuse resistance can be increased and sensed to a different logic value. If the voltage keeps increasing, the current follows the I-V curve segment 42 until reaching a critical current, Icrit, that causes negative resistance. The Icrit is understood as a minimum current to break a fuse. However, the Icrit also represents the beginning of thermal runaway—where the heat generated is more than the heat can be lost to the environment. After Icrit, in the segment 43, the fuse I-V characteristic is chaotic and unpredictable because the physics laws of energy conservation break down. Conventional electrical fuse programming is to apply a high voltage to program in the region 43. However, a reliable fuse programming is to limit programming below Icrit, the thermal runaway condition. In other words, programming a fuse in the region 42 is reliable, deterministic, controllable, and can be predicted by physics—this is the conventional way of reliable programming.

However, the reliable programming for a PUF can be different from the conventional way of reliable programming, because PUF needs nearly 50% of unprogrammed and programmed bits to satisfy the randomness requirement. In one embodiment, the pre-condition for an OTP PUF is to program the OTP bits around the EM threshold. Firstly, if the program voltage is around the EM threshold, all bits will be programmed at least once, no matter what they can be read as 0 or 1. The program status would be very difficult to be determined by any external means, such as optical, SEM, or TEM inspection, or nanoprobe to measure resistance, but can be easily read internally and electrically. The program status of the PUF can be read using a sensing circuit. Programming this way meets the first requirement of a PUF—undetectable logic states by reverse engineering. This programming method can also create a mixed of 0 and 1 random data.

Figure 3B:
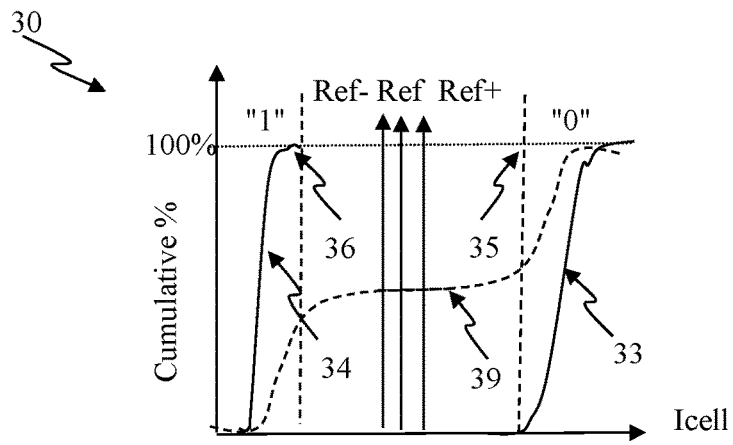
FIG. 3(b) shows a distribution of cell currents before and after programming with reference cell currents.

FIG. 3(b) shows a portion of OTP cell current distributions 30 before and after programming for further explanation. The cell currents can be obtained by applying a very low programming voltage, too low to cause actually programming, and measuring the current flowing through the program pin of an OTP macro. This is the cell current that can be converted into the fuse resistance in the cell. Curves 33 and 34 are cumulative percentage of cell current distributions before and after normal reliable programming, respectively. In normal situation, both curves 33 and 34 are expected to be very narrowly spread and are wide apart so that the data 0 and 1 can be sensed easily and reliably by comparing with a reference current Ref. The sensing window to determine 1 versus 0 is the point 36, maximum of cell current after program, and 35, minimum of cell current before program, respectively. However, for using OTP as a PUF, a blur cell current distribution like 39 is more desirable. The cell current distribution like 39 can be generated by several embodiments as follows.

A method of programming a fuse reliably can include the following steps: (a) starting with a low program voltage initially to program a portion of an OTP memory and incrementing the program voltage until all OTP cells can be programmed and verified successfully; marked this voltage as a low bound of the program voltage, (b) continuously incrementing the program voltage to program a portion of OTP memory cells until at least one OTP cell, whether programmed or not, is verified failure, marked the previous pass voltage as a high bound of the program voltage. Furthermore, the program time can be adjusted to characterize the program window by repeating the above steps (a) and (b) accordingly until a low bound, high bound, or program window (voltage range between high and low bound) is found. The program window of an electrical fuse programmed reliably is marked in the segment 42 in FIG. 3(a). After characterizing the program window, the other OTP cells can be programmed with a voltage between the low and high bounds in at least one pulse.

A method of measuring the cell current, such as curves in FIG. 3(b), can include the following steps: (a) applying a voltage to a program pad VDDP in the program mode, low enough that cannot program the OTP cells, (b) preventing the VDDP from supplying current to the OTP macro other than the OTP memory array, (c) turning on the selector of the OTP cell to be measured, and (d) measuring the current flowing through the VDDP pad as the cell current of the selected OTP cell. This method is applicable to those OTP cells that have been programmed or not. This method can also be used as a criterion to determine whether an OTP cell is verified as being in an un-programmed state or a programmed state by using a maximum cell current 36 for programmed and a minimum cell current 35 for un-programmed, respectively, in FIG. 3(b) to determine the low and high bounds of a program voltage during characterization. This method can verify the resistance of an OTP cell, other than using a sense amplifier to convert the cell resistance into logic data.

Based on this principle of OTP PUF programming, there are some embodiments to achieve randomness like curve 39 in FIG. 3(b). The source to create randomness is called entropy source. One embodiment is to apply a fixed voltage around the minimum voltage with a fixed program time to generate random data. Another embodiment is to apply a voltage/time with a certain distribution, e.g., Gaussian distribution of program voltage/time with a mean and a standard deviation, to provide additional randomness. Another embodiment is to get another entropy source, such as initialized a bi-stable device to reach equally 0/1 state randomly, and program the random data into the OTP with a fixed voltage/time or with certain distributions. There are many variations of similar but equivalent embodiments of OTP PUF programming methods and they all fall into the scope of this invention for those skilled in the art.

Figure 4:
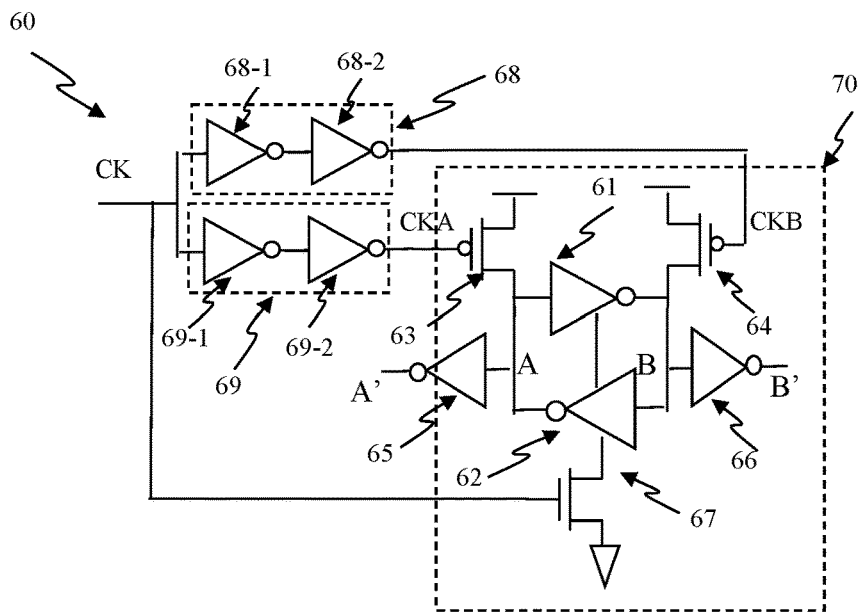
FIG. 4 shows a portion of a schematic diagram of a bi-stable circuit that can be initialized into random states.

FIG. 4 shows a portion of a schematic diagram of an entropy source 60 as input data to be programmed into an OTP PUF. Schematics 60 has two cross-coupled inverters 61 and 62 with two nodes A and B and two PMOS pull ups, 63 and 64, respectively, coupled to node A and B. The two inverters 61 and 62 also have a common NMOS 67 pull-down, coupled to the sources of the NMOS in inverters 61 and 62 to enable latching. The sources of PMOS 63 and 64 are coupled to Vdd and their gates are coupled to clocks CKA and CKB, respectively. CKA and CKB are outputs of two delay chains 68 and 69 from a common clock CK. The delay chain 68 has a plurality of inverters 68-1 and 68-2, while the delay chain 69 has a plurality of inverters 69-1 and 69-2 to provide delays and also act as clock buffers. The inverters in the delay chains 68 and 69 need to be even number to work correctly in FIG. 4. When CK is low, the two inverter nodes A and B are pre-charged to Vdd. When CK goes high, the PMOS 63 and 64 with gates coupled to CKA and CKB, respectively, are turned off while NMOS 67 is turned on to activate the cross-coupled inverters 61 and 62. Depending on the relative timing of CKA and CKB going high, nodes A and B can be settled to 0 or 1. Thus random data can be generated into nodes A and B. Inverters 65 and 66 are buffers to bring nodes A and B to output A' and B', respectively. For the schematics shown in FIG. 4, the output data of A' or B' may favor certain states based on minor device mismatch and turning off of PMOS pullups 63 and 64. A plurality of the circuit blocks shown in FIG. 4 can be used to generate a PUF after some post-processing for reading reliably. The data A' or B' can also be used as input data, entropy source, to be programmed into an OTP PUF to provide another means of randomness.

Figure 4A:
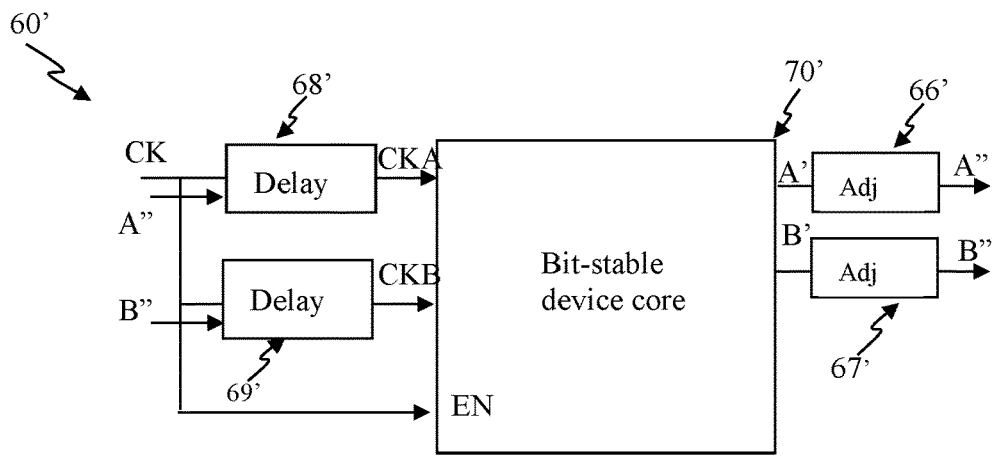
FIG. 4(a) shows a portion of a schematic diagram of a bi-stable circuit that can be initialized into random states, according to another embodiment.

FIG. 4(a) shows a portion of a schematic diagram of an entropy source, according to another embodiment. This is a more general embodiment than that in FIG. 4. FIG. 4(a) can be a true a random number generator 60' that can also be used as an entropy source for a PUF. Block 60' has a bi-stable core 70', two sets of clock delay blocks 68' and 69' to generate CKA and CKB, respectively, and two sets of delay adjustment circuits 66' and 67' to generate signals A" and B" to control clock delays in blocks 68' and 69', respectively. The blocks 60', 68', 69', and 70' in FIG. 4(a) are corresponding to blocks 60, 68, 69, and 70 in FIG. 4. The bi-stable core 70' can have devices corresponding to 61-67 as shown in FIG. 4. The delay blocks 68' and 69' are coupled between CK to CKA and CKB of the bi-stable core to generate delay signals for PMOS pull-ups, corresponding to PMOS 63 and 64 in FIG. 4, The output A' and B' of the bi-stable core 70' are coupled to the adjust blocks 66' and 67', to generate signals A" and B" for delay adjustment, respectively. A" and B" are further fed back to the input of the delay blocks 68' and 69' to control delays of the clocks CKA and CKB, respectively. This circuit 60' takes the output bit streams of A' and B', corresponding to FIG. 4, convert them into level signals A" and B" in 66' and 67', and use them to adjust the clock delays in block 68' and 69', respectively. The circuit 60 in FIG. 4 is suitable for entropy sources to provide natural random data for a PUF based on natural device mismatch. However, the circuit 60' has feedback mechanism through 66', 67', 68', and 69' to generate nearly 50% of 0s and 1s in A' and B' to account for any systematic mismatch in the bi-stable core 70' so as to generate true random numbers, more than as an entropy source as in FIG. 4.

Figure 4B:
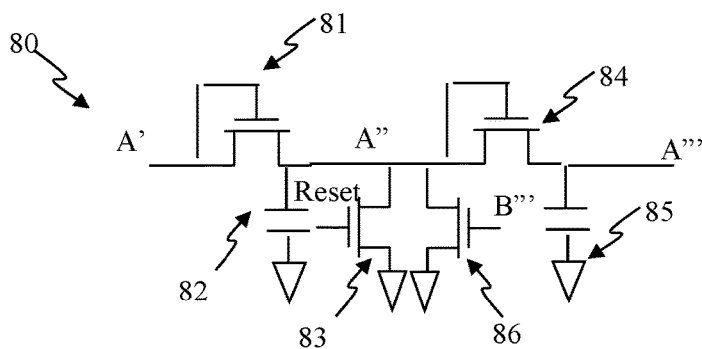
FIG. 4(b) shows a portion of a schematic diagram of an adjustment circuit, corresponding to FIG. 4(a), according to one embodiment.

FIG. 4(b) shows a portion of a schematic diagram of an adjustment block 80, corresponding to 66' and 67' in FIG. 4(a), according to one embodiment. The purpose of this circuit block is to convert a pulse into a DC voltage based on percentage of data 0 and 1. Block 80 has an input A' coupled to the drain and gate of an NMOS 81, whose source A" is coupled to a capacitor 82 and a drain of a MOS 83. The other end of capacitor 82 and the source of MOS 83 are coupled to ground. The gate of NMOS 83 is coupled to a reset signal. Node A" is coupled to the drain and gate of a MOS 84, whose source is coupled to a capacitor 85 and to ground. There is a feedback MOS 86 with drain and source coupled to node A" and ground, respectively. The gate of MOS 86 is coupled to B''', corresponding to the same signal name B''' in FIG. 4(a), as a feedback control. The devices 81 and 82 converts the input pulse A' into a level signal A", while the MOS 86 is to adjust the voltage level A" based on signal B''' feedback from the adjust branch B, 67' corresponding to FIG. 4(a). The adjust block 67' in FIG. 4(a) can be based on FIG. 4(b) with the associated signals A and B interchanged. In another embodiment, the diode-connect MOS 81 can be replaced by two switches between A' and A" and coupled to the capacitor 82. By switching the non-ground node of the capacitor 82 between A' and A", the bit stream A' can be converted into a level signal to A" without a Vth loss. Essentially, this is a circuit to convert a bit-stream waveform into an average DC level without any voltage loss. In another embodiment, the MOS 84 and capacitor 85 can be omitted and the gate of the feedback MOS 86 can be coupled to B" with proper device size adjusted in MOS 86.

Figure 4C:
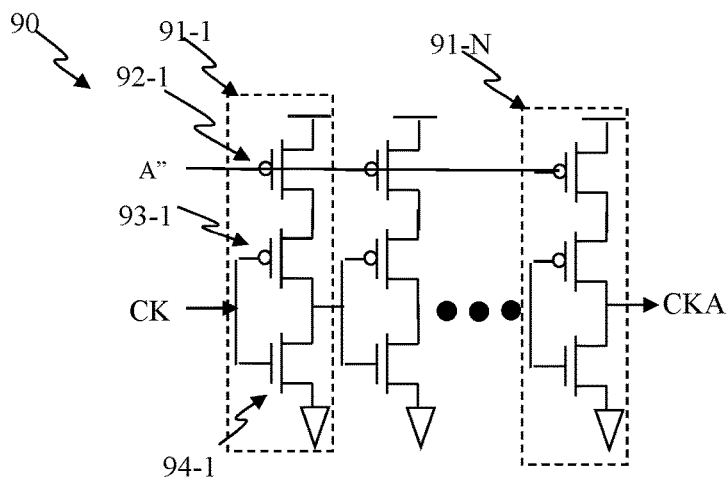
FIG. 4(c) shows a portion of a schematic diagram of a clock delay circuit, corresponding to FIG. 4(a), according to one embodiment.
Figure 5:
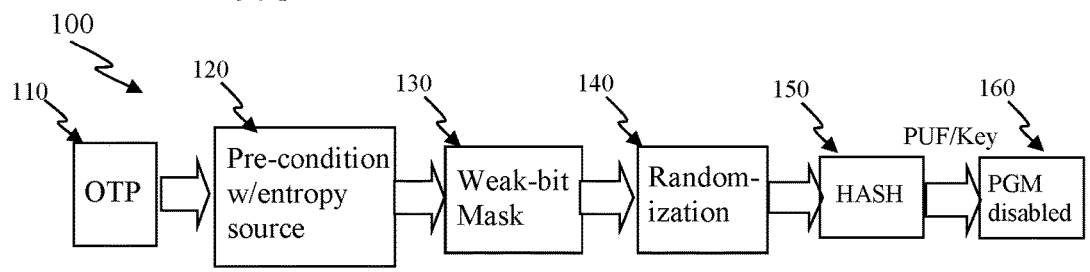
FIG. 5 shows a portion of a schematic diagram of using OTP as a PUF according to one embodiment of the present invention.

FIG. 4(c) shows a portion of a schematic diagram of a control delay chain 90, corresponding to 68' and 69' in FIG. 4(a), according to one embodiment. The block 90 has a plurality of PMOS controlled inverters 91-1 through 91-N. Each controlled inverter has a PMOS pull-up with source coupled to VDD, gate coupled to a signal A" and drain coupled to an inverter consists of PMOS 93-1 and NMOS 94-1, as shown in 91-1. The output of the controlled inverter 91-1 is coupled to the input of another control inverter 91-2 and so on and to generate an output clock CKA after N stages. The clock CKA will be delayed in high going edge with respect to input CK based on the level signal A". This block can be applied to 68' and 69', corresponding to FIG. 4(a), to generate delayed clocks CKA and CKB, respectively. In another embodiment, the block in FIG. 4(b) can be replicated with an inverted input A', so as to generate a complementary level signal. This level signal can be used to control NMOS gates in the controlled inverters with both PMOS pull-up and NMOS pull-down, similar to the circuit shown in FIG. 4(c). There are many variants and equivalent embodiments of delay adjustment and clock delay circuits, corresponding to 66'-67' and 68'-69' in FIG. 4(a), respectively, and they all fall into the scope of this invention for those skilled in the art FIG. 5 shows a portion of a block diagram 100 to generate PUF data and/or key according to one embodiment of the present invention. The block diagram 100 consists steps of pre-condition 120, weak-bit mask 130, randomization 140, hash function 150, and program disabled 160 blocks. Since a key requires 100% read correct and more stringent randomness, the hash block 150 can be applied to the output of the PUF for key generation. The OTP 110 is an OTP macro that can be programmed for PUF applications according to description in FIGS. 3(a), 3(b), 4, 4(a), 4(b) and 4(c). Any OTP program mechanisms based on explosion or charge trapping should be ruled out, because of unreliably to meet stringent PUF requirements. Pre-condition 120 is to apply randomness into the OTP bits to be programmed. The programming can be a fixed voltage or time around the minimum program voltage threshold, or can be a distribution of program voltage/time around the minimum program voltage/time. For example, if OTP cells are programmed with a program window of 1.0 to 1.4 Volts, then the program voltage for programming the PUF data can be about 0.9 Volts, and/or with 0.02V standard deviation of a Gaussian distribution.

In another embodiment, the data to be programmed can come from an additional entropy source as shown in FIGS. 4, 4(*a*), 4(*b*) and 4(*c*), if varying program voltage/time cannot provide enough entropy for PUF. In any way, whether the cells have data 0 or 1 will be programmed at least once so that the program status of the cells cannot be detected by invasive hacks.

The weak-bit mask 130 in FIG. 5 is to detect those poorly programmed bits that can't be determined reliably as 0 or 1. One embodiment is to have more than one reference resistor, with resistance Ref−, Ref, and Ref+, where Rf+>Ref>Ref−, Ref~1.2K and Rf+/Rf− with at least 300 ohm apart. Only reads with both Ref and Ref+ passed can be considered as data 1. Similarly, only reads with both Ref− and Ref passed can be considered as data 0. By doing this way, any fuse resistance, either 0 or 1, can be guaranteed with sufficient resistance margins to stand harsh read voltage, temperature, process variation, or aging. Using three reference resistors for weak-bit mask is only one of many embodiments. There are many varieties and equivalent embodiments to serve this purpose and they all fall within the scope of this invention.

Randomization 140 in FIG. 5(*a*) is a post-process to create nearly 50% of data 0 or 1, in case the natural randomness in pre-condition 120 is not enough. One very effective way to create randomness is to generate a parity bit, namely, exclusive ORing (XOR) a plurality of bits to generate a single output bit. One embodiment is to read a plurality of OTP bits QI[i], i=0, 1, 2, n−1 at once, and exclusive OR them to generate one single output bit Q, i.e., Q=QI[0]⊗QI[1]⊗QI [2]⊗ . . . QI[n−1]. Another embodiment is to generate 8 consecutive bits and XOR all of them together to get a single bit output every 8 cycles. Yet another embodiment is called von Neumann corrector which examines every pair of data bits. The pairs will be discarded if the two bits are the same, otherwise only the first bit of the pair is kept. Post processing can increase the randomness with small area or power overheads while reducing the data rate based on decimation factors. Then, the data stream is ready for use as a PUF.

PUF can tolerate BER (bit error rate) of about 5 ppb (part per billion), but a key requires 100% read correct every time and nearly 50% of data 0 and 1. The block 150 in FIG. 5 shows one embodiment to generate a key after generating PUF data by using a hash function at the hash block 150. A hash function is a one-way data scramble function, which means a small data variation can result in huge difference in the output so that obtaining the output data cannot trace back the input easily. In another embodiment, a PUF can have an output from a hash function. There are many hash functions in the cryptography, such as MD5, SHA (Secure Hash Algorithm), etc. An OTP macro can generate a PUF and many keys by using different banks of the OTP. After the PUF and keys are generated, the block 160 can be activated to program at least one OTP bit to disable any further programming.

Figure 6A:
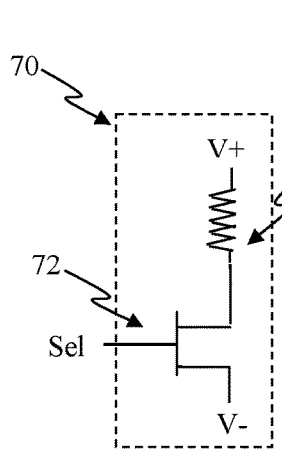
FIG. 6(a) shows a schematic diagram of a 1R1T, one resistor and one MOS, cell in an OTP PUF.
Figure 6B:
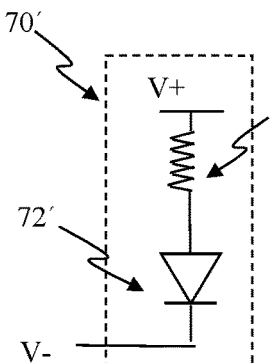
FIG. 6(b) shows a schematic diagram of a 1R1D, one resistor and one diode, cell in an OTP PUF.
Figure 6C:
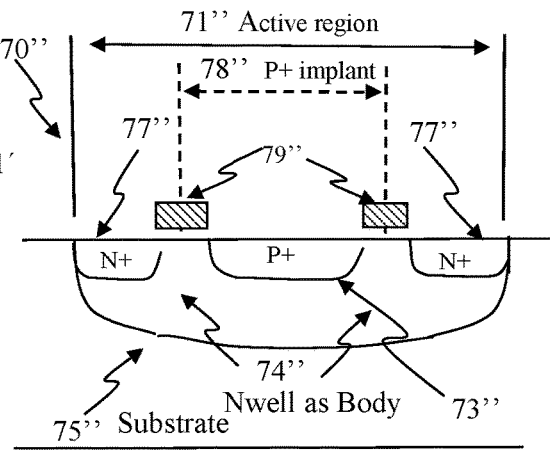
FIG. 6(c) shows a portion of a cross section of an OTP cell in an OTP PUF.

After the overall block diagram of an OTP PUF and key generation is depicted in FIG. 5, the root of PUF, OTP,  desires to be explained further in subsequent paragraphs. FIG. 6(*a*) shows a 1R1T OTP cell 70 that has one resistor 71 and a MOS selector 72. The fuse 71 has one end coupled to the drain of the MOS 72 and the other end to a first voltage supply line V+. The MOS 72 has a gate coupled to a select signal Sel, which is further coupled to a third supply voltage line, and a source coupled to a second supply voltage line V−. By applying high voltages between V+ and V− and turning on Sel, the fuse 71 can be configured to be programmable into a different logic state. FIG. 6(*b*) shows another 1R1D OTP cell 70' that has one resistor 71' and one diode selector 72'. The fuse 71' has one end coupled to the anode of the diode 72' and the other end to a first voltage supply line V+. The diode 72' has a cathode coupled to a second supply voltage line V−. By applying high voltages between V+ and V−, the fuse 71' can be configured to be programmable into a different logic state.

Either the OTP cell in FIG. 6(*a*) or 6(*b*) can be fabricated in standard CMOS process. FIG. 6(*c*) shows a portion of a cross section of two diode selectors 70" inside an N-well 74" on top of a P-substrate 75". 71" is an active region to house the MOS or diode device. There are two polysilicon 79" to divide the active 70" into at least two portions of active regions 73" and 77". The first active region 73" can be doped with the first type of dopant 78", while the second active region 77" can be doped with the second type of dopant to construct a diode. If the second active region 77" is doped with the first type of dopant as in the active 78", this device is a PMOS.

Figure 7:
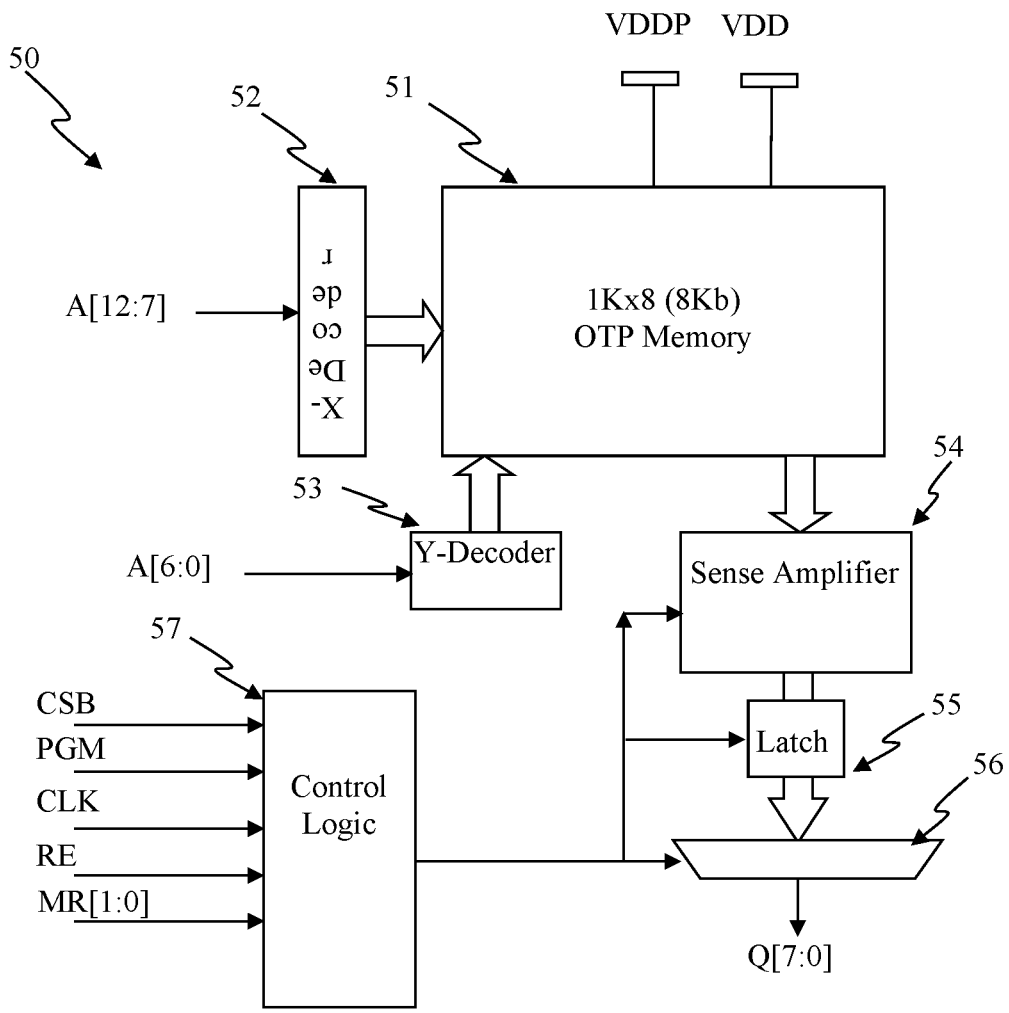
FIG. 7 shows a portion of a schematic diagram of an OTP memory in an OTP PUF.

FIG. 7 shows a portion of a block diagram of a 1Kx8 OTP memory 50 as an example that has a memory array 51, X-decoders 52, Y-decoder 53, sense amplifiers 54, output latch 55, output multiplexer (MUX) 56, and control logic 57. The OTP memory cells in memory array 51 can be 1R1T or 1R1D cells, corresponding to FIGS. 6(*a*) and 6(*b*), respectively. The cells in array 51 can be accessed through X-address A[12:7] via X-decoder 52 and Y-address A[6:0] via Y-decoder 53. The OTP cells can be programmable if a high voltage is applied to VDDP and proper X/Y-addresses A[12:0] are selected. Similarly, the OTP cells can be selected for read by turning on the sense amplifier 54 with proper X/Y-addresses A[12:0] selected. The sensed data can be stored in latches 55 and go through the output multiplexer 56 to data out Q[7:0]. There is a control logic 57 to generate suitable control signals for read and program. The control signals MR[1:0] can be used to select reference resistors Ref−, Ref, or Ref+ in different margin modes to check if the read passes with sufficient resistance margins. This embodiment is suitable to build an OTP PUF as a custom-design macro.

Figure 8:
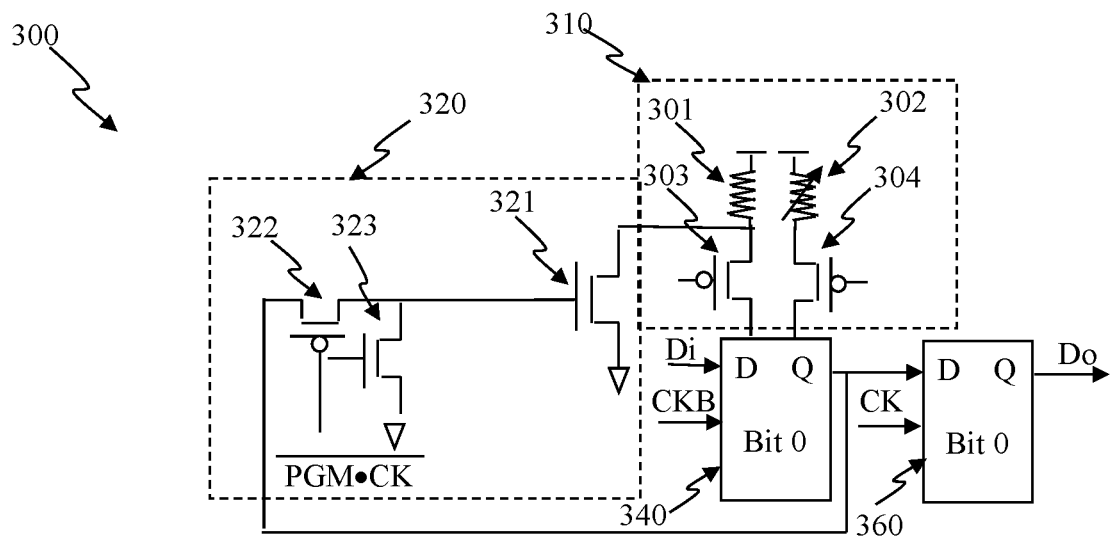
FIG. 8 shows a portion of a schematic diagram of another OTP bit cell in an OTP PUF that can be synthesized into an OTP memory.

Another OTP embodiment is to build OTP bitcells so that a plurality of OTP cells can be synthesized in a standard cell library. If a PUF is built in random logic by using a standard cell library, the PUF is almost unhackable because the PUF is submerged into a sea of Boolean logic gates that would take tremendous amount of reverse engineering efforts. FIG. 8 shows a portion of an OTP bit-cell schematics 300 according to one embodiment. The bit cell 300 has a fuse unit 310 that has a fuse element 301, reference resistor 302 that are coupled to a master latch 340 through input pass gates 303 and 304, respectively. The gates of the input pass gates 303 and 304 can be enabled to couple fuse 301 and reference 302 to input nodes of a latch-type sense amplifier (SA) 340, namely, the SA 340 can also serve as a master latch. The master latch 340 has an output coupled to an input of a slave latch 360. The fuse unit 310 is coupled to a program selector 321 in a program unit 320. The program unit 320 also has control enable gates 322 and 323 to activate programming when the data in the master latch 340 and program signal PGM are both high during clock CK high period. In this embodiment, all OTP cells can be read with an enable signal into the master latches at once. However, programming an OTP cell is selective. In one embodiment, the OTP bit cells 300 are coupled in shift register configuration, namely the slave latch 360 is coupled to the master latch 340 of the next bit cell. The content of the master latch 340 can be shifted with data 1 along with CK and PGM asserted for programming. In another embodiment, the slave latch 360 can be omitted and the program selector gate 321 can be selected via X-decoders for programming by random accesses with proper addresses specified. Either way, only the sub-blocks, such as fuse unit 310, program selector 321 and SA/latch 340 need to be custom designed as a basic cell in a standard cell library, while the rest of the glue logic can be synthesized using automated design flow. The schematic in FIG. 8 is for illustrative purpose, there can be many different variations and yet equivalent embodiments of building OTP PUF in standard cell libraries and they all fall within the scope of this invention.

Figure 8A:
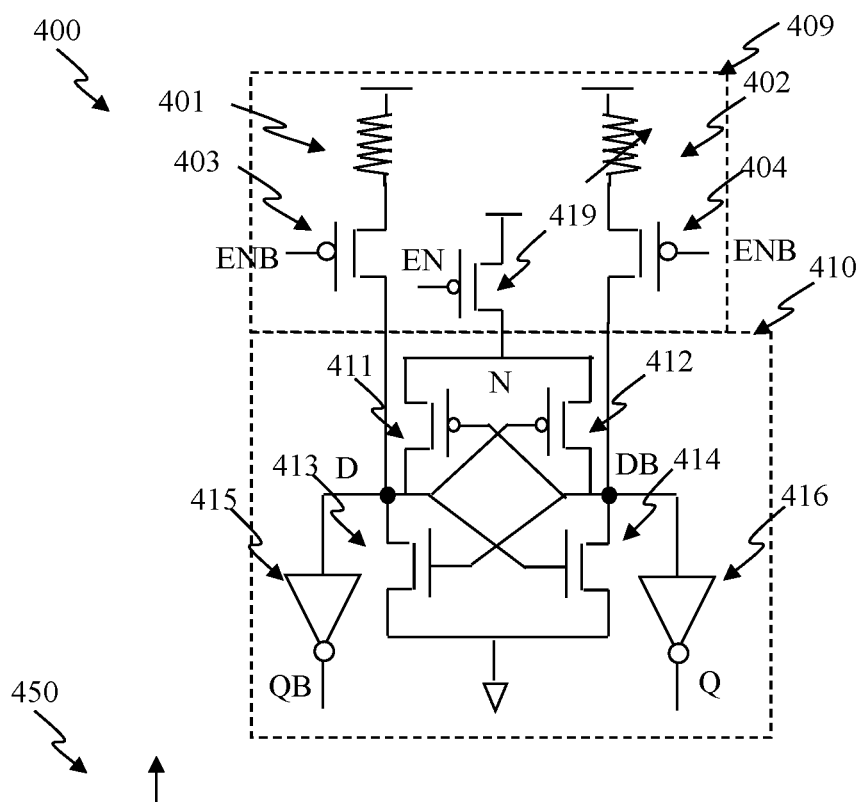
FIG. 8(a) shows a portion of a schematic diagram of a sense amplifier in an OTP bit cell, corresponding to the embodiment in FIG. 8.

FIG. 8(a) shows a portion of a schematic diagram 400 of a fuse block and latch-type sense amplifier (SA) circuit, corresponding to fuse block 310 and SA/latch 340 in FIG. 8, according to one embodiment. The schematic 400 includes a latch/SA 410 coupled to an OTP fuse block 409. The latch/SA 410 has a pair of cross-coupled inverters constructed by PMOS 411 and 412 and NMOS 413 and 414, with output nodes D and DB. The sources of NMOS 413 and 414 are coupled to VSS and the drains coupled to drains of PMOS 411 and 412, respectively. The sources of PMOS 411 and 412 are coupled to a node N. The node N is coupled to a PMOS 419 to VDD, where the gate of the PMOS 419 is coupled to an enable signal EN. The gates of PMOS 411 and NMOS 413 are coupled to the drains of PMOS 412 and NMOS 414, while the gates of PMOS 412 and NMOS 414 are coupled to the drains of PMOS 411 and NMOS 413. The two nodes D and DB are coupled to output QB and Q through inverters 415 and 416, respectively. The fuse block 409 has a fuse element 401 coupled to VDD and source of an input pass gate 403. Similarly, a reference resistor 402 is coupled to VDD and source of another input pass gate 404. The drains of the input pass gates 403 and 404 are coupled to the nodes D and DB, respectively, which are the internal nodes in the cross-coupled inverters in the latch/SA 410. The gates of the input pass gate 403 and 404 are coupled to ENB.

Figure 8B:
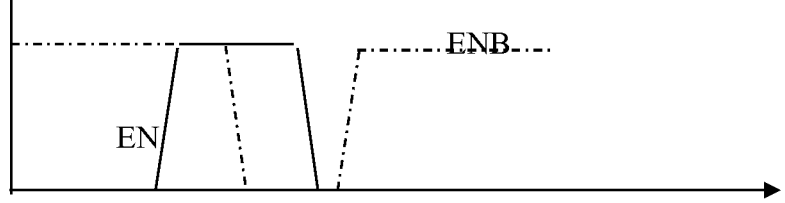
FIG. 8(b) shows a timing waveform of signals, corresponding to the sense amplifier shown in FIG. 8(a).

FIG. 8(b) shows a timing waveform 450 to illustrate a sensing operation with respect to the fuse block and latch/(SA combined circuit 400 in FIG. 8(a), according to one embodiment. Before sensing, EN is low and ENB is high so that the cross-coupled inverter built by MOS 411-414 is configured as a latch 410. During sensing, EN goes high and ENB goes low so that the fuse element 401 and reference element 402 are coupled to the drains of NMOS 411 and 412, respectively. This constructs an R-NMOS latch by the fuse element 401, reference resistor 402, NMOS 413 and 414, while the PMOS 411 and 412 half latch is disabled. Some differential voltages will be developed in nodes D and DB accordingly. After the signals in DB and D are stable, EN can be pulled low and ENB high to enable another PMOS half-latch, constructed by PMOS 411 and 412. This also cutoff the input pass gates 403 and 404 so that the data in nodes D and DB can be latched without consuming any static current. In another embodiment, the input device 403 or reference input pass gates 404 can be selectively turned on to load data "1" or "0" into the latch/SA 410, respectively.

Figure 9:
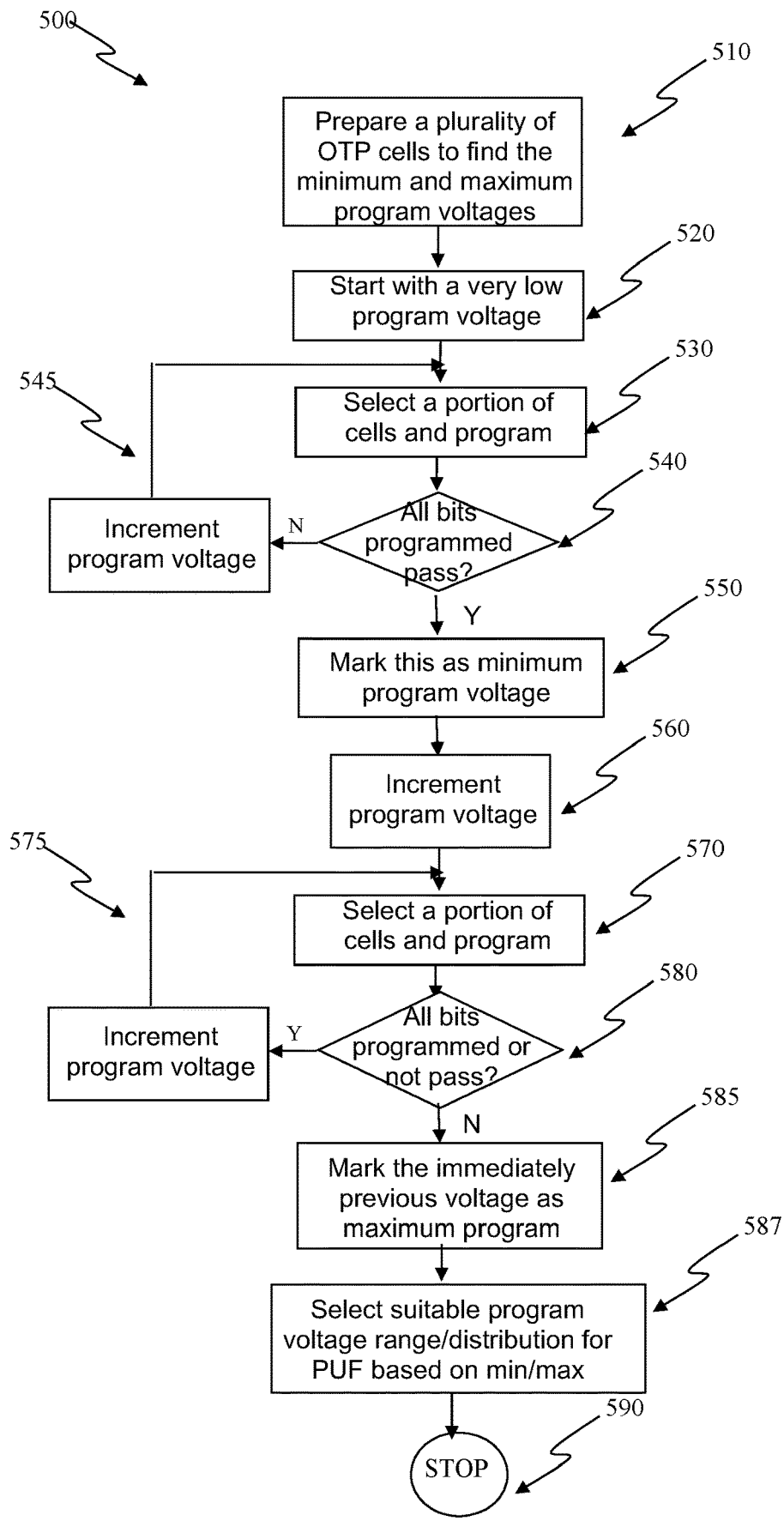
FIG. 9 depicts a method of calibrating the program voltages and selecting a suitable program voltage for an OTP PUF in a flow chart, according to one embodiment of the present invention.
Figure 10:
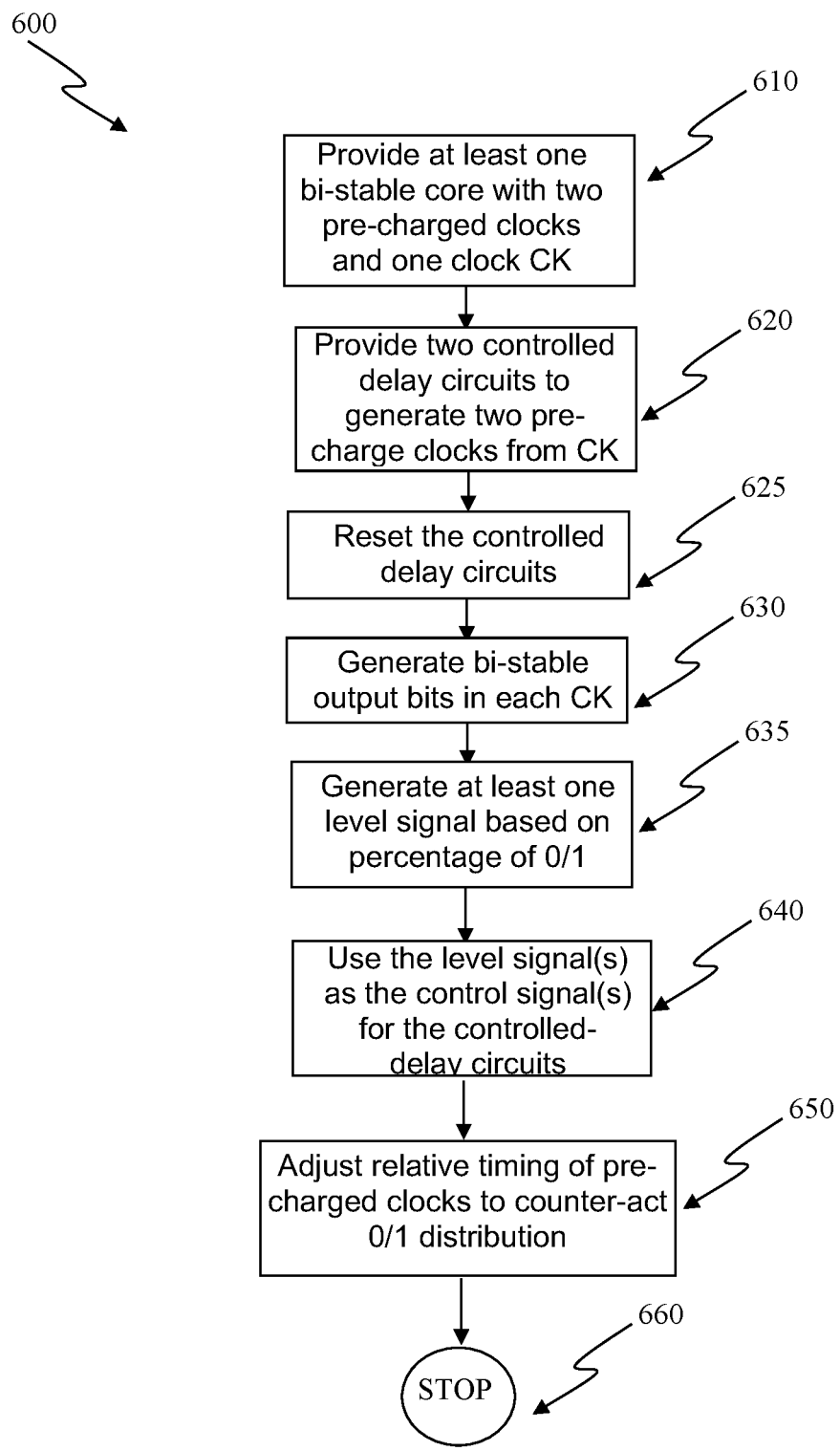
FIG. 10 depicts a method of generating data from another entropy source for an OTP PUF in a flow chart, according to one embodiment of the present invention.
Figure 11:
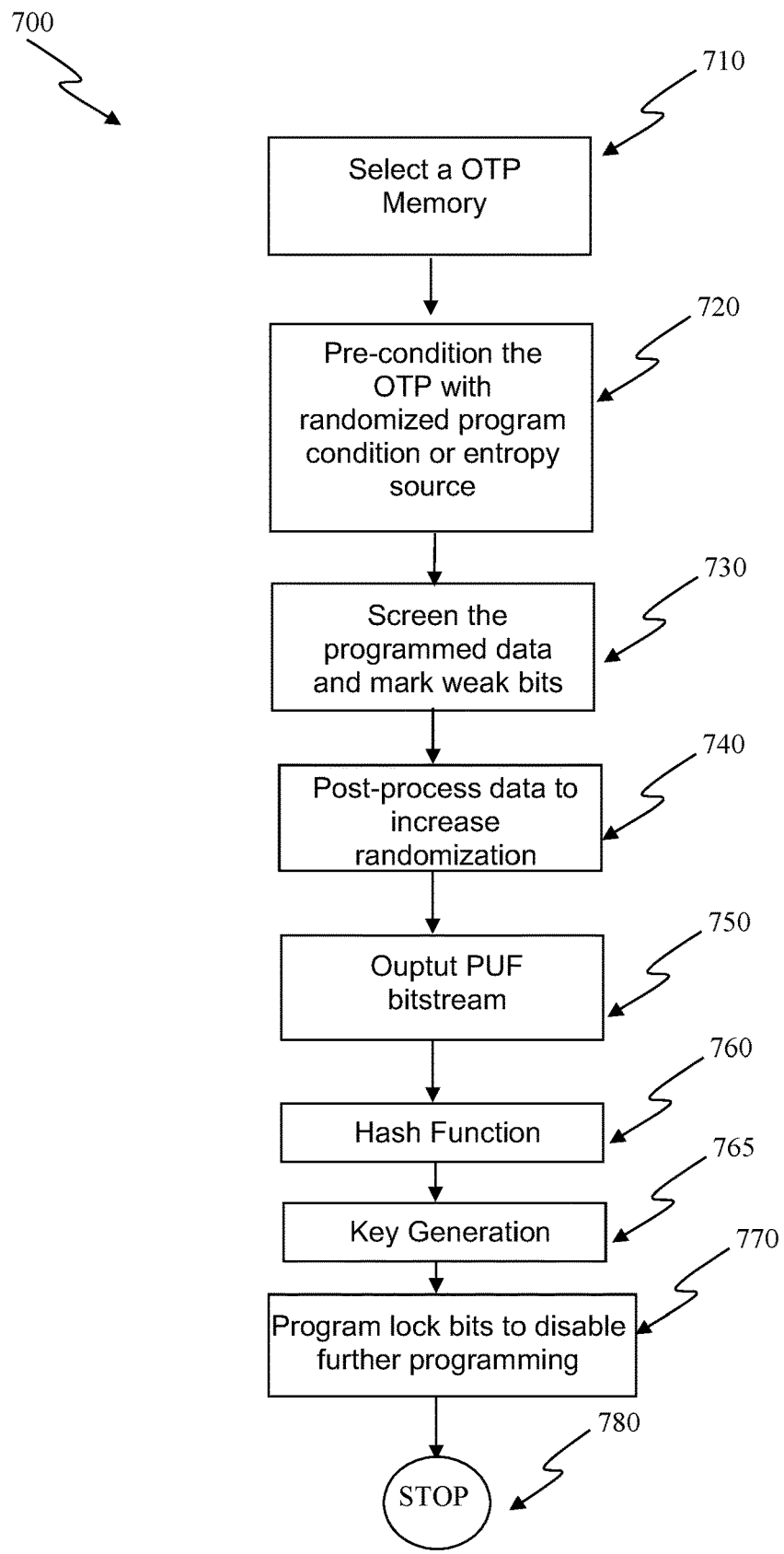
FIG. 11 depicts a method of generating data for an OTP PUF in a flow chart, according to one embodiment of the present invention.

FIGS. 9-11 show flow charts depicting embodiments of reliable OTP programming, true random number generation, OTP PUF and/or key generation in accordance with certain embodiments. The methods 500-700 are described in the context of reliable programming (FIGS. 3(a) and 3(b)), entropy source (FIG. 4), random number generator (FIGS. 4(a)-4(c)), OTP PUF and key generation (FIG. 5), respectively. In addition, although described as a flow of steps, one of ordinary skilled in the art will recognize that at least some of the steps may be performed in a different order, including simultaneously, or skipped.

FIG. 9 depicts a method 500 of programming an OTP reliably for PUF and/or keys in a flow chart, according to one embodiment. In the first step 510, prepare a plurality of OTP cells to find the minimum and maximum program voltage of reliable programming. In step 520, select a very low OTP program voltage to start with. In step 530, select a portion of OTP cells and program them accordingly. Then verify if all cells programmed are passed or not in step 540. If no, increment the program voltage in 545 and go back to 530 and programming again. If yes, mark this voltage as the minimum program voltage of reliable programming in step 550. Then, increment the program voltage again in 560 and resume programming in 570. In step 580, verify if all cells can be programmed passed. If yes, increment the program voltage in 575 and go back to step 570 and programming again. If no, mark the immediately previous program voltage as the maximum program voltage of reliable programming in 585. In step 587, select a suitable program voltage for PUF that can be between the maximum and minimum of the reliable program voltages found or can be near the minimum program voltage so as to generate nearly 50% of 0s and 1s. Alternatively, the program voltage can be near the minimum voltage with a distribution. Then, this procedure stops at 590 after a suitable or a range of suitable program voltages are found.

FIG. 10 shows a flow chart depicting embodiments of true random number generation method 600 in accordance with certain embodiments. In step 610, provide at least one bi-stable core with two pre-charged clocks and one enable clock CK. In step 620, provide two controlled delay circuits to generate two pre-charged clocks from the clock CK. In step 625, reset the controlled delay circuits and use the defaults for the controlled-delay circuit. In step 630, generate bi-stable output in each clock CK cycle. In step 635, generate at least one level signal based on the percentage of 0 or 1 from the bi-stable output. In step 640, use the level signal(s) as the control signals for the controlled delay circuits. In step 650, the relative timing of the pre-charged clocks are adjusted based on the feedback from the level signals so as to counter-act the 0 or 1 distribution to nearly 50%. In step 660, the distribution of 0 and 1 can reach to nearly 50% after sufficient time of feedback adjustment to achieve a true random number bit stream.

FIG. 11 depicts a method 700 of generating OTP PUF and/or keys in a flow chart, according to one embodiment. In the first step 710, select an OTP memory as a source of providing the raw random data for further processing to generate a PUF or keys. In the second step 720, the data in the OTP memory are pre-conditioned, namely, programmed according to an entropy source. The pre-condition can be programmed at a fixed voltage/timing or a randomized voltage/timing distribution around the minimum program voltage/time. Alternatively, the data to be programmed can come from another entropy source, such as sending a bi-state cell as shown in FIGS. 4-4(c) as one embodiment. In the step 730, the OTP data are analyzed and the unstable bits that cannot be clearly read as 0 or 1 are marked and discarded for further uses. In the step 740, the OTP data are further randomized to increase the entropy by generating a parity bit or by von Neumann corrector in a post process. The bits after processed can be sent as PUF output in step 750. Additionally, the PUF data from 750 can be further processed through a hash function in step 760. Hash functions can be the well-known MD5 or SHA in cryptography. A portion of PUF data through hash function output 760 can be further selected, hashed, or randomized to generate at least one security key in step 765. If all bits of a PUF or keys are generated, this OTP can be disabled further programming by programming at least one lock bit in step 770. Finally, this procedure stops in 780 after the PUF data and/or security keys are generated.

Figure 12:
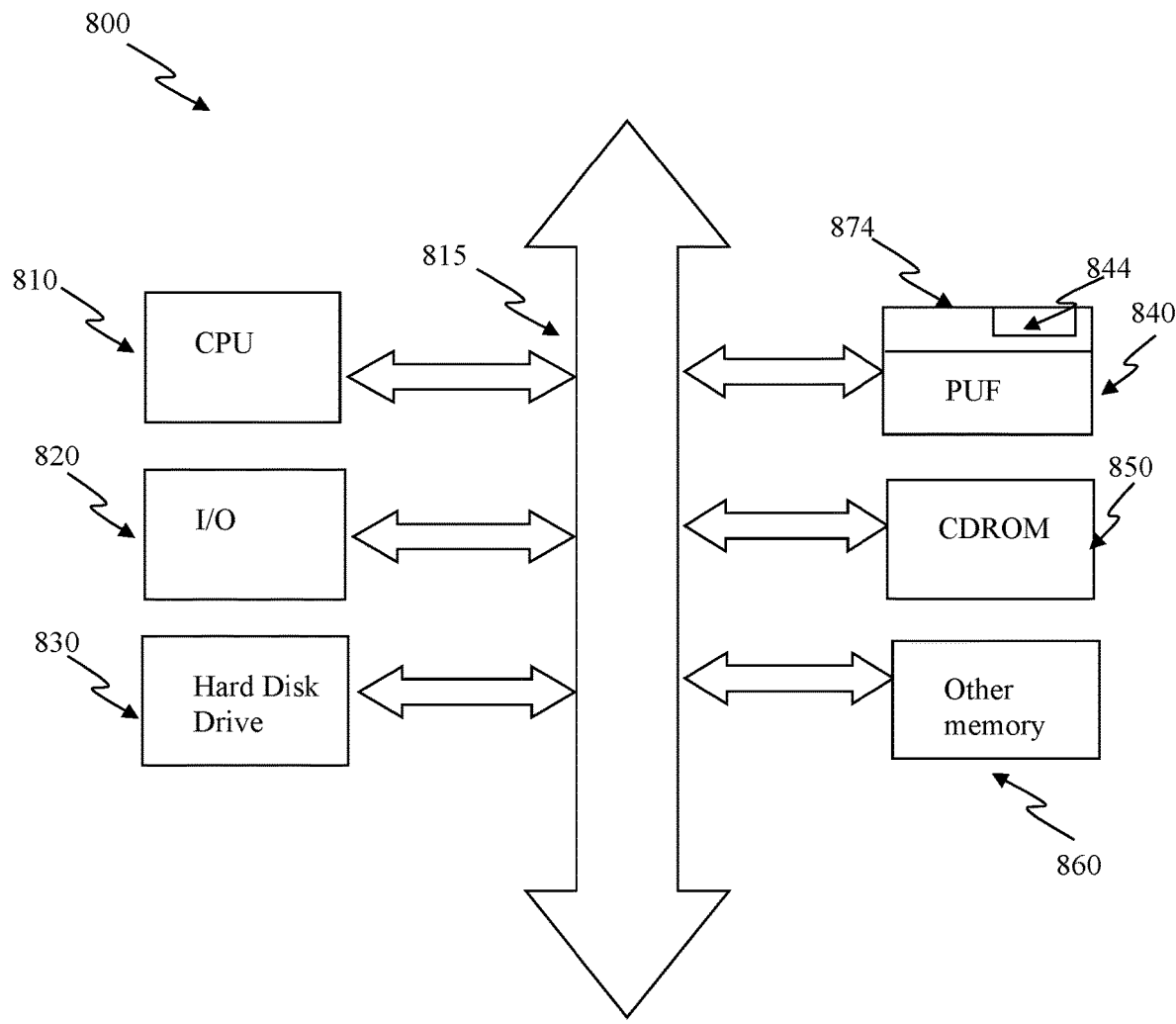
FIG. 12 shows a processor system including a PUF, according to one embodiment of the present invention.

FIG. 12 shows a processor system 800 according to one embodiment. The processor system 800 can include a PUF device 840, including at least one OTP memory 874 with a plurality of OTP cells 844, according to one embodiment. The processor system 800 can, for example, pertain to a computer system. The computer system can include a Central Process Unit (CPU) 810, which communicates through a common bus 815 to various memory and peripheral devices such as I/O 820, hard disk drive 830, CDROM 850, and other memory 860. Other memory 860 can be a conventional memory such as SRAM, DRAM, or flash, typically interfaces to CPU 810 through a memory controller. CPU 810 generally is a microprocessor, a digital signal processor, or other programmable digital logic devices. PUF 840 is preferably constructed as an integrated circuit, which includes the OTP memory 874 having at least one OTP cell 844. The PUF 840 typically interfaces to CPU 810 through a bus. If desired, the PUF 840 may be combined with the processor, for example CPU 810, in a single integrated circuit.

The invention can be implemented in a part or all of an integrated circuit in a multiple-chip module, or in a system. The OTP PUF can be any kinds of fuse material that can be programmed reliably. The fuse can be silicided or non-silicided polysilicon fuse, thermally isolated active-region fuse, local interconnect fuse, metal fuse, contact fuse, via fuse, fin structure or fuse constructed from CMOS gates. The additional entropy sources can be any delay, bi-sble, or bi-stable devices that can be hardened into an OTP. The randomization can be any procedures to increase the entropy of data. One embodiment can be parity bit, by XORing all bits. The other embodiment can be discarding same bits in any pairs but keep the first bit of any pairs otherwise to increase the data entropy. Though there can be many variations and equivalent embodiments, they all fall into the scope of this invention for those skilled in the art.

The above description and drawings are only to be considered illustrative of exemplary embodiments, which achieve the features and advantages of the present invention. Modifications and substitutions of specific process conditions and structures can be made without departing from the spirit and scope of the present invention.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An electronic device producing a Physically Unclonable Function (PUF) value, comprising:
    at least one OTP memory that can be programmed using a program voltage that is below a maximum program voltage;
    at least one entropy source to provide data to be programmed into the OTP memory;
    at least one weak-bit mask to detect unstable bits and to remove the unstable bits of the OTP memory from usage; and
    at least one post processing device to further randomize the data from the at least one entropy source,
    wherein the PUF value is produced based on at least programming the at least one entropy source into the OTP memory, and then randomizing the data in the at least one post processing device, and
    wherein the at least one entropy source includes at least one bi-stable device and at least one control device, the at least one bi-stable device is configured to be controlled at least in part by the at least one control device to generate the data so that it is initially randomized.

2. An electronic device as recited in claim 1, wherein the program voltage is below a minimum program voltage that can be characterized to reach approximately 100% program yield into a predetermined logic state.

3. An electronic device as recited in claim 2, wherein the OTP cells are programmed with a fixed or varying voltage/time around a minimum voltage/time that can program the OTP cells into a different logic state.

4. An electronic device as recited in claim 1, wherein for a given bit of the data provided by the at least one entropy source that is initially randomized, the given bit yields approximately 50% 0 s and 50% 1 s.

5. An electronic device as recited in claim 1, wherein the OTP cells are programmed with voltages and/or time according to the at least one entropy source.

6. An electronic device as recited in claim 5, wherein the at least one bi-stable device includes at least a pair of cross-coupled inverters, and wherein the at least one control device includes at least first and second pull-up transistors.

7. An electronic device as recited in claim 1, wherein the output of the OTP memory is read with multiple reference resistors to mask the unstable bits.

8. An electronic device as recited in claim 1, wherein a plurality of bits passing masking are further randomized by generating a single parity bit to replace the plurality of the bits in blocks.

9. An electronic device as recited in claim 1, wherein the plurality of bits from the output of the PUF are scrambled by a hash function and/or to generate at least one security key.

10. An electronic device as recited in claim 1, wherein the OTP memory has a plurality of OTP cells; each OTP cell has at least one OTP element consists of at least one of polysilicon, silicide polysilicon, metal, metal gate, MOS gate, thermally isolated active area, fin structure, or combined thereof.

11. An electronic system, comprising:
    a processor; and
    a Physically Unclonable Function (PUF) operatively connected to the processor, the PUF including:
        a plurality of OTP cells that can be programmed reliably below a maximum program voltage;
        an entropy source to provide data to be programmed into the OTP cells;

a weak-bit mask unit to detect the unstable bits and to prevent them from further use;

a randomization unit to increase the randomness of the data stream by at least one post processing; and wherein data from the PUF is used to identify a chip after the OTP cells are configured to be programmable with an entropy source and are processed with at least one unit, and wherein the entropy source comes from random data generated in bi-stable devices produced cycle by cycle.

12. An electronic system as recited in claim 11, wherein the entropy source using feedback so that the random data generated in bi-stable devices produced cycle by cycle yields approximate 50% 0 s and 50% 1 s for a given bit of the random data.

13. An electronic system as recited in claim 11, wherein the OTP cells are programmed with a fixed or varying voltage/time around a minimum program voltage/time that can program the OTP cells into a different logic state approximately 100%.

14. An electronic system as recited in claim 11, wherein the bi-stable devices produced are controlled at least in part by one or more control devices to generate approximate 50% of 0 s and 50% 1 s using feedback from output data.

15. An electronic system as recited in claim 11, wherein the randomization is by replacing a plurality of bits with a single parity bit in blocks.

16. An electronic system as recited in claim 11, wherein the output of the PUF can be further processed through at least one hash function and/or to generate at least one security key.

17. A method of generating PUF data in an integrated circuit, comprising:

providing a plurality of OTP cells, that least one of the OTP cells can be programmed reliably below a maximum program voltage;

providing at least one entropy source to generate data to be programmed into the OTP cells, the at least one entropy source including at least a plurality of bi-stable devices and one or more control devices;

programming the at least one OTP cell into a different logic state with the at least one entropy source; and providing at least one post process to further randomize the data, wherein the randomized data generated can be used for chip identification or authentication, and wherein the bi-stable devices are controlled at least in part by the one or more control devices to generate approximate 50% of 0 s and 50% 1 s.

18. A method as recited in claim 17, wherein the bi-stable devices include at least a pair of cross-coupled inverters and at least the one or more control devices generate random data of approximately 50% of 0 s and 50% 1 s for a given bit.

19. A method as recited in claim 17, wherein the randomized data have at least one procedure to adjust the time to release pre-charging the at least one of the bi-stable devices so as to closer to 50% of 0 and 50% 1 as follows: (i) providing at least one bi-stable devices for at least a portion of the at least one entropy source; (ii) providing at least one control device to determine data in the bi-stable devices upon activation; (iii) adjusting the timing of the at least control devices based on 0/1 data distribution, and (iv) compensating the timing of the at least control device by feedback to reduce deviation of 0/1 to approximately zero.

20. A method as recited in claim 17, wherein the OTP cells are read with different reference resistances and the OTP cells that cannot be read successfully with a range of reference resistances will be masked from further use.

21. A method as recited in claim 17, wherein a plurality of bits can be randomized by replacing the plurality bits with a single parity bit in blocks.

22. A method as recited in claim 17, wherein the output data of the PUF are further processed through at least one hash function and/or to generate at least one keys in the output.

23. A method of generating PUF data in an integrated circuit, comprising:

providing a plurality of OTP cells, that least one of the OTP cells can be programmed using a randomized program voltage and/or time to generate random data;

providing at least one entropy source to generate data to be programmed into the OTP cells; and programming at least one of the OTP cells into a different logic state using the generated data from the at least one entropy source, wherein the programmed data into the at least one of the OTP cells is used as PUF data for the integrated circuit, and wherein the at least one entropy source includes at least one bi-stable device and at least one control device, the at least one bi-stable device is configured to be controlled at least in part by the at least one control device to generate random data, where for a given bit of the random data being generated, there are approximately 50% 0 s and 50% 1 s.

* * * * *